United States Patent
Hayashi et al.

(10) Patent No.: US 8,804,015 B2
(45) Date of Patent: Aug. 12, 2014

(54) COLOR IMAGING DEVICE

(71) Applicant: FUJIFILM Corporation, Tokyo (JP)

(72) Inventors: Kenkichi Hayashi, Saitama (JP); Seiji Tanaka, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/931,064

(22) Filed: Jun. 28, 2013

(65) Prior Publication Data

US 2013/0286263 A1    Oct. 31, 2013

Related U.S. Application Data

(63) Continuation of application No. PCT/JP2012/053776, filed on Feb. 17, 2012.

(30) Foreign Application Priority Data

Feb. 21, 2011  (JP) ................................. 2011-034627
Jul. 25, 2011  (JP) ................................. 2011-162415
Dec. 27, 2011  (JP) ................................. 2011-286006

(51) Int. Cl.
*H04N 3/14* (2006.01)
*H04N 5/335* (2011.01)
*H04N 9/04* (2006.01)

(52) U.S. Cl.
USPC ........................................................ 348/273

(58) Field of Classification Search
USPC .............. 348/220.1, 267, 272, 273, 275, 276, 348/277, 278, 279; 250/208.1, 226
See application file for complete search history.

(56) References Cited

U.S. PATENT DOCUMENTS 6,421,084 B1    7/2002  Chang et al.
2002/0149686 A1*  10/2002  Taubman ...................... 348/272

FOREIGN PATENT DOCUMENTS

JP    8-23543 A    1/1996
JP    11-285012 A    10/1999
(Continued)

OTHER PUBLICATIONS

PCT/ISA/210—International Search Report mailed Mar. 27, 2012, issued in PCT/JP2012/053776.
(Continued)

*Primary Examiner* — Aung S Moe
*Assistant Examiner* — Chriss Yoder, III
(74) *Attorney, Agent, or Firm* — Birch, Stewart, Kolasch & Birch, LLP

(57) ABSTRACT

A color filter array includes a basic array pattern constituted by a square array pattern that corresponds to 5×5 pixels, and the basic array pattern is repeatedly arranged in horizontal and vertical directions. In the basic array pattern, the G filters that are brightness system pixels are arranged on at least the both diagonal lines. As a result, the G filter is arranged in each line of horizontal, vertical, and diagonal directions of the color filter array, and the R and B filters are arranged in each line of the horizontal and vertical directions of the color filter array. In addition, a ratio of the number of G pixels that help most to obtain a brightness signal of the basic array pattern is greater than each ratio of the number of R pixels and the number of B pixels that correspond to the other colors, thereby executing demosaic processing effectively.

12 Claims, 14 Drawing Sheets

(56) References Cited

FOREIGN PATENT DOCUMENTS

| | | |
|---|---|---|
| JP | 2000-308080 A | 11/2000 |
| JP | 2005-136766 A | 5/2005 |
| JP | 2007-306490 A | 11/2007 |
| JP | 2010-512048 A | 4/2010 |
| WO | 2008/066698 A2 | 6/2008 |

OTHER PUBLICATIONS

PCT/ISA/237—Written Opinion of the International Searching Authority mailed on Mar. 27, 2012, issued in PCT/JP2012/053776.
Chinese Office Action issued in Chinese Application No. 201280004454.5 on Dec. 24, 2013.

* cited by examiner

|    | 1 | 7 | 13 | 19 | 25 | 31 | 37 | 43 |
|----|---|---|----|----|----|----|----|----|
|    | G | G | B  | R  | G  | B  | R  | G  | ~P2'
|    | R | R | G  | G  | B  | G  | G  | R  |
|    | B | B | G  | G  | R  | G  | G  | B  |
|    | G | G | R  | B  | G  | B  | R  | G  |
|    | B | B | G  | G  | R  | G  | G  | B  |
|    | R | R | G  | G  | B  | G  | G  | R  |
|    | G | G | R  | B  | G  | R  | B  | G  |

FIG.9

|    | G | R | B | G | R | B | G |
|----|---|---|---|---|---|---|---|
| 1  | G | R | B | G | R | B | G |
| 7  | G | B | R | G | B | R | G | ~P2'
| 13 | R | G | G | B | G | G | R |
| 19 | B | G | G | R | G | G | B |
| 25 | G | R | B | G | B | R | G |
| 31 | B | G | G | R | G | G | B |
| 37 | R | G | G | B | G | G | R |
| 43 | G | R | B | G | R | B | G |

COLOR IMAGING DEVICE

CROSS-REFERENCE TO RELATED APPLICATIONS

This application is a PCT Bypass continuation application and claims the priority benefit under 35 U.S.C. §120 of PCT Application No. PCT/JP2012/053776 filed on Feb. 17, 2012 which application designates the U.S., and also claims the priority benefits under 35 U.S.C. §119 of Japanese Patent Applications Nos. 2011-034627 filed on Feb. 21, 2011, 2011-162415 filed on Jul. 25, 2011 and 2011-286006 filed on Dec. 27, 2011 which applications are all hereby incorporated in their entireties by reference.

BACKGROUND OF THE INVENTION

1. Field of the Invention

The presently disclosed subject matter is related to a color imaging device, and in particular, to a color imaging device that can suppress occurrence of color moire and achieve high resolution.

2. Description of the Related Art

Since an output image of a single-panel color imaging device is a RAW image (mosaic image), a multi-channel image is obtained by processing to interpolate a pixel of a missing color from the surrounding pixel (synchronization processing, demosaic processing). In this case, there is a problem of a reproduction characteristic of a high-frequency image signal, and there is an issue in which it is important that high-resolution is achieved by expanding a reproduction band while suppressing occurrence of color moire (false color) since, in the color imaging device, aliasing is easily generated in a captured image as compared with a monochrome imaging device.

In a primary color system Bayer array that is a color array that is widely used in the single-panel color imaging device, since green (G) pixels are arranged in a checkered pattern, and red (R) pixels and blue (B) pixels are arranged line-sequentially, there is a problem of reproduction accuracy when a high frequency signal is generated in the diagonal directions for the G signal and reproduction accuracy when a high frequency signal is generated in the horizontal and vertical directions for the R and B signals.

In a case in which a monochrome vertical stripe pattern (high frequency image) as illustrated in portion (A) in FIG. 19 enters an imaging device of a Bayer array illustrated in portion (B) in FIG. 19, when the entered pattern is allocated to a Bayer color array and compared for each color, as illustrated in portion (C) to portion (E) in FIG. 19, a color image of R in light flat, a color image of B in dark flat, and a color image of G in light/dark mosaic are generated, and the original monochrome image in which there is no concentration difference (level difference) between R, G, and B becomes in a state of being colored depending on a color array and an input frequency.

Similarly, in a case in which a diagonal monochrome high frequency image as illustrated in portion (A) in FIG. 20 enters an imaging device of a Bayer array illustrated in portion (B) in FIG. 20, when the entered pattern is allocated to a Bayer color array and compared for each color, as illustrated in portion (C) to portion (E) in FIG. 20, color images of R and B in light flat and a color image of G in dark flat are generated, and when it is assumed that a black value is 0 and a white value is 255, the diagonal monochrome high frequency image becomes in green because only G becomes 255. As described above, in the Bayer array, the diagonal high frequency image cannot be reproduced appropriately.

Generally, in an imaging apparatus that uses a single-panel type color imaging device, an optical low pass filter that is constituted by a birefringence material such as crystal is arranged in the front of the color imaging device, and a high frequency is avoided so as to be optically reduced. However, in this method, coloring by the folding of the high frequency signal can be reduced, but there is a problem that the resolution is reduced due to the adverse effect.

In order to solve such a problem, a color imaging device has been proposed in which a color filter array of the color imaging device is a three-colors random array that satisfies an array restriction condition in which a given focused pixel is adjacent to any of three colors including a color of the focused pixel on the four sides of the focused pixel (Japanese Patent Application Laid-Open No. 2000-308080).

In addition, an image sensor of a color filter array has been proposed that includes a plurality of filters having different spectral sensitivities, and in which a first filter and a second filter out of the filters are alternately arranged in one diagonal direction of a pixel grid of the image sensor in a first certain cycle and are alternately arranged in the other diagonal direction in a second certain cycle (Japanese Patent Application Laid-Open No. 2005-136766).

In addition, a color array has been proposed in which, in a color solid imaging device of three primary colors of R, G, and B, appearance probabilities of R, G, and B are equalized and a given straight line (horizontal, vertical, or diagonal straight line) on an imaging surface passes through all of the colors by arranging sets of 3 pixels in which R, G, and B are horizontally arranged so that the sets are shifted in a zig-zag manner (Japanese Patent Application Laid-Open No. 11-285012).

In addition, a color imaging device has been proposed in which R and B out of three primary colors of R, G, and B are arranged in the horizontal direction and the vertical direction in every three pixels, and G is arranged between R and B (Japanese Patent Application Laid-Open No. 8-23543).

SUMMARY OF THE INVENTION

The color imaging device discussed in Japanese Patent Application Laid-Open No. 2000-308080 has a random filter array, and in the color imaging device, it is necessary that optimization is performed for each random pattern when subsequent synchronization (interpolation) processing is executed, so that there is a problem that the synchronization processing becomes complicated. In addition, the random array is effective in low-frequency color moire, and is not effective in a false color of a high frequency part.

In addition, in the image sensor discussed in Japanese Patent Application Laid-Open No. 2005-136766, the G pixels (brightness pixels) are arranged in the checkered pattern, so that there is a problem that pixel reproduction accuracy in a limit resolution area (particularly, in the diagonal directions) is not excellent.

In the color solid imaging device discussed in Japanese Patent Application Laid-Open No. 11-285012, there is an advantage that occurrence of a false color can be suppressed because filters for all of the colors exist on the given straight line, however, there is a problem that the high frequency reproducibility is reduced as compared with a Bayer array because ratios of the number of pixels of R, the number of pixels of G, and the number of pixels of B are equal. Note that in the case of the Bayer array, a ratio of the number of G pixels that help most to obtain a brightness signal is twice as great as each ratio of the number of R pixels and the number of B pixels.

On the other hand, the color imaging device discussed in Japanese Patent Application Laid-Open No. 8-23543 is not effective in a false color of a high frequency part in the horizontal or vertical direction because each ratio of the number of R pixels and the number of B pixels to a ratio of the number of G pixels is higher than that of the Bayer array, and a line of only G pixels exists in the horizontal or vertical direction.

The presently disclosed subject matter is made in view of these circumstances, and an object of the presently disclosed subject matter is to provide a color imaging device that can suppress occurrence of a false color, achieves high resolution, and simplify subsequent processing as compared with a conventional random array.

In order to attain the object, a color imaging device according to an aspect of the presently disclosed subject matter is a single-panel type color imaging device configured by arranging color filters of a certain color filter array on a plurality of pixels that are constituted by photoelectric conversion elements that are arranged in a horizontal direction and a vertical direction, wherein the color filter array includes a basic array pattern of N×N (N: odd number which is equal to five or more) in which first filters that correspond to a first color that contributes most to obtaining a brightness signal and second filters that correspond to two or more second colors other than the first color are arranged, and the basic array pattern is arranged in the horizontal direction and the vertical direction repeatedly, the first filters are arranged on at least the two diagonal lines of the basic array pattern, a ratio of a number of pixels of the first color that correspond to the first filters is greater than a ratio of a number of pixels of the each of the second colors that corresponds to the second filters, and one or more of the second filters that respectively correspond to each of the second colors are arranged in each line of the horizontal direction and the vertical direction of the color filter array in the basic array pattern.

In the color imaging device according to the aspect of the presently disclosed subject matter, the basic array pattern of N×N (N: odd number of five or more) in which the first filter that corresponds to the first color that contributes most to obtaining a brightness signal and the second filters that respectively correspond to the two or more second colors other than the first color are arranged is repeatedly arranged in the horizontal and vertical directions. As a result, subsequent synchronization (interpolation) processing can be executed in accordance with the repeat pattern, and the subsequent processing can be simplified as compared with a conventional random array.

In addition, at least the first filters are arranged on the two diagonal lines in the basic array pattern. As a result, the first filter is arranged in each line of the horizontal, vertical, upper right diagonal, and lower right diagonal directions of the color filter array, and reproduction accuracy of the synchronization processing in a high frequency area can be improved. In addition, one or more of each of the second filters are arranged in each line of the horizontal and vertical directions of the color filter array in the basic array pattern. As a result, occurrence of color moire (false color) is suppressed and high resolution can be achieved.

In addition, the first filter and the second filters are arranged so that a ratio of the number of pixels of the first color that corresponds to the first filter is greater than each ratio of the number of pixels of the second colors that respectively correspond to the second filters. As a result, aliasing can be suppressed and high frequency reproducibility is also excellent.

In a color imaging device according to another aspect of the presently disclosed subject matter, it is desirable that the first filters are arranged in a checkered pattern in the basic array pattern. As a result, the first filter is arranged in each line of the horizontal, vertical, upper right diagonal, and lower right diagonal directions of the color filter array, and a ratio of the number of G pixels can be increased to substantially the same extent as the total number of pixels of the other colors.

In a color imaging device according to another aspect of the presently disclosed subject matter, it is desirable that the first filters are arranged so that an array of the first filters in the color filter array and an array of the first filters in a color filter array that is obtained by down-sampling the color filter array to 1/(N−1) in the horizontal direction or the vertical direction are substantially identical. As a result, in an image that is down-sampled and read out at the time of capturing a moving image, the arrays of the first filters, which are the main of the imaging processing are substantially identical, so that load of the imaging processing can be reduced.

In a color imaging device according to another aspect of the presently disclosed subject matter, it is desirable that the first filters and the second filters are arranged so that the color filter array and a color filter array that is obtained by down-sampling the color filter array to 1/(N−1) in the horizontal direction or the vertical direction are substantially identical. As a result, the imaging processing at the time of capturing a still image and the imaging processing at the time of capturing a moving image can be set as common processing.

In a color imaging device according to another aspect of the presently disclosed subject matter, it is desirable that the one or more first filters are arranged in each line of horizontal, vertical, upper right diagonal, and lower right diagonal directions of the color filter array.

In a color imaging device according to another aspect of the presently disclosed subject matter, it is desirable that the color filter array includes a square array that corresponds to 2×2 pixels that are constituted by the first filter. Using pixel values of the 2×2 pixels, a direction having high correlation can be determined from the horizontal, vertical, upper right diagonal, and lower right diagonal directions.

In a color imaging device according to another aspect of the presently disclosed subject matter, it is desirable that the color filter array in the certain basic array pattern is point symmetrical with respect to the center of the basic array pattern. As a result, the circuit scale of a processing circuit in downstream can be reduced.

In a color imaging device according to another aspect of the presently disclosed subject matter, it is desirable that the color filter array in the certain basic array pattern is line symmetrical with respect to at least one of the lines of horizontal, vertical, upper right diagonal, and lower right diagonal directions that passes through the center of the basic array pattern. As a result, the circuit scale of a processing circuit in downstream can be reduced.

In a color imaging device according to another aspect of the presently disclosed subject matter, it is desirable that the first color is a green (G) color, and the second colors are a red (R) color and a blue (B) color.

In a color imaging device according to another aspect of the presently disclosed subject matter, it is desirable that the color filter includes an R filter, a G filter, and a B filter that respectively correspond to the red (R) color, the green (G) color, and the blue (B) color, and the R filter, the G filter, and the B filter are arranged so that the filters having different colors are adjacent to each other in the horizontal and vertical directions of the color filter array in the basic array pattern. As a result, it is easy to create an array that satisfies a condition in which the one or more R filters and the one or more B filters are arranged in each line of the horizontal and vertical directions of the color filter array in the basic array pattern.

In a color imaging device according to another aspect of the presently disclosed subject matter, it is desirable that the color filter includes an R filter, a G filter, and a B filter that respectively correspond to the red (R) color, the green (G) color, and the blue (B) color, and the R filter, the G filter, and the B filter are arranged along the upper right diagonal or lower right diagonal direction of the color filter array in the basic array pattern. As a result, it is easy to create an array that satisfies a condition in which the one or more R filters and the one or more B filters are arranged in each line of the horizontal and vertical directions of the color filter array in the basic array pattern.

In a color imaging device according to another aspect of the presently disclosed subject matter, it is desirable that the color filter includes an R filter, a G filter, and a B filter that respectively correspond to the red (R) color, the green (G) color, and the blue (B) color, and the R filters and the B filters are irregularly arranged so that the number of R filters and the number of B filters are equal in the basic array pattern. As a result, a false color can be reduced.

According to the presently disclosed subject matter, occurrence of false color can be reduced, the high resolution can be achieved, and subsequent processing can be simplified as compared with the conventional random array.

BRIEF DESCRIPTION OF THE DRAWINGS

FIG. 4 is a diagram illustrating a second embodiment of the single-panel type color imaging device according to the presently disclosed subject matter;

FIG. 5 is a diagram illustrating a color filter array that is obtained by down-sampling the color imaging device of the second embodiment to 1/(N−1) in the horizontal direction;

FIG. 6 is a diagram illustrating a color filter array that is obtained by down-sampling the color imaging device of the second embodiment to 1/(N−1) in the vertical direction;

FIG. 7 is a diagram illustrating a third embodiment of the single-panel type color imaging device according to the presently disclosed subject matter;

FIG. 8 is a diagram illustrating a color filter array that is obtained by down-sampling the color imaging device of the third embodiment to 1/(N−1) in the horizontal direction;

FIG. 9 is a diagram illustrating a color filter array that is obtained by down-sampling the color imaging device of the third embodiment to 1/(N−1) in the vertical direction;

DETAILED DESCRIPTION OF EXEMPLARY EMBODIMENTS

Preferred embodiments of a color imaging device according to the presently disclosed subject matter are described below with reference to the accompanying drawings.

<First Embodiment>

Figure 1:
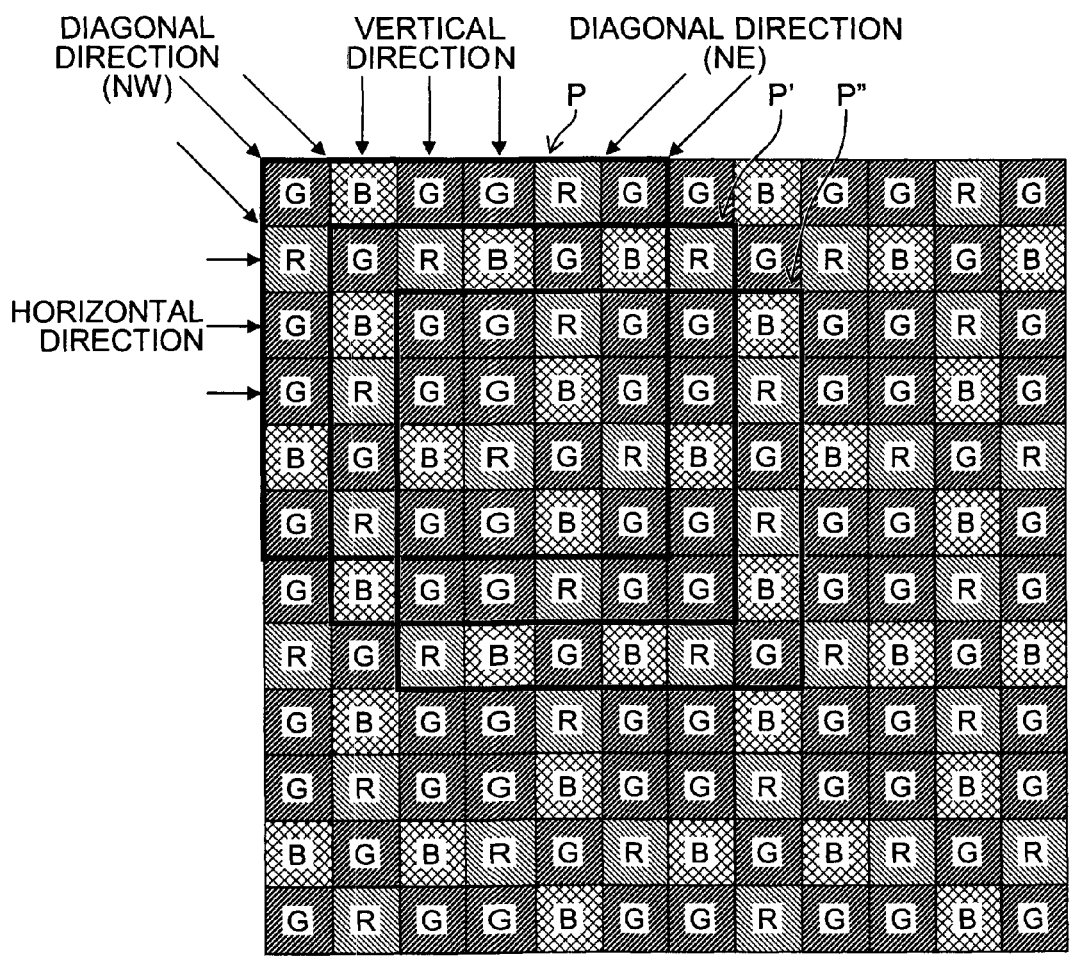
FIG. 1 is a diagram illustrating a first embodiment of a single-panel type color imaging device according to the presently disclosed subject matter.

FIG. 1 is a diagram illustrating a first embodiment of a single-panel type color imaging device according to the presently disclosed subject matter, and in particular, illustrating a color filter array of color filters that are provided in the color imaging device.

The color imaging device includes a plurality of pixels (not illustrated) that are constituted by photoelectric conversion devices that are arranged in the horizontal direction and the vertical direction (two-dimensional array), and color filters of a color filter array that is illustrated in FIG. 1 and arranged on a light receiving surfaces of each pixel, and any of the color filters of three primary colors of red (R), green (G), and blue (B) is arranged on each of the pixels.

Note that the color imaging device is not limited to a CCD (Charge Coupled Device) color imaging device, and may be another type of imaging device such as a CMOS (Complementary Metal Oxide Semiconductor) imaging device.

<Features of the Color Filter Array>

The color filter array of the color imaging device of the first embodiment includes the following features (1), (2), (3), (4), (5), and (6).

(Feature (1))

The color filter array illustrated in FIG. 1 includes a basic array pattern P (pattern indicated by the thick frame) that is constituted by a square array pattern that corresponds to 6×6 pixels, and in the color filter array, the basic array pattern P is repeatedly arranged in the horizontal direction and the vertical direction. That is, in the color filter array, the color filters of R, G, and B (the R filter, the G filter, and the B filter) are arranged with a certain cyclic nature.

Synchronization (interpolation) processing (demosaic processing) etc. for R, G, and B signals that are read out from the color imaging device can be executed in accordance with the repeat pattern because the R filter, the G filter, and the B filter are arranged with the certain cyclic nature as described above.

In addition, when an image is reduced by executing downsampling processing in unit of the basic array pattern P, a color filter array of the reduced image on which the downsampling processing was executed can be the same as the color filter array before the down-sampling processing, so that a common processing circuit can be used.

(Feature (2))

In the color filter array illustrated in FIG. 1, G filters that correspond to a color that contributes most to obtaining a brightness signal (color of G in the embodiment) are arranged in each line of the horizontal, vertical, and diagonal (NE and NW) direction of the color filter array. Note that NE indicates the upper right diagonal direction, and NW indicates the lower right diagonal direction. For example, in a case of a square pixel array, the upper right diagonal and lower right diagonal directions are directions of 45° with respect to the horizontal direction, and in a case of a rectangle pixel array, the upper right diagonal and lower right diagonal directions are directions of diagonal lines of the rectangle, and the angles vary depending on the lengths of long side and short side. That is, the upper right diagonal direction is a direction of a diagonal line that rises to the right, of two diagonal lines of pixels, and the lower right diagonal direction is a direction of a diagonal line that rises to the left, of the two diagonal lines of pixels.

The reproduction accuracy of the synchronization processing in a high frequency area can be improved regardless of a direction having a high frequency because the G filters that correspond to the brightness system pixel are arranged in each line of the horizontal, vertical, and diagonal (NE and NW) directions of the color filter array.

(Feature (3))

In the basic array pattern of the color filter array illustrated in FIG. 1, the number of pixels of the R pixel, the G pixel, and the B pixel that correspond to the R filter, the G filter, and the B filter are 8 pixels, 20 pixels, 8 pixels, respectively. That is, a proportion of the number of pixels of the R pixel, the G pixel, and the B pixel is 2:5:2, and a ratio of the number of G pixels that help most to obtain a brightness signal is greater than each ratio of the number of R pixels or the number of B pixels.

As described above, the ratio of the number of G pixels is different from the each of the ratios of the number of R pixels and the number of B pixels, and in particular, the ratio of the number of G pixels that help most to obtain a brightness signal is greater than each of the ratios of the number of R pixels and the number of B pixels, so that aliasing at the time of the synchronization processing can be suppressed, and the high frequency reproducibility can be also improved.

(Feature (4))

In the color filter array illustrated in FIG. 1, the one or more R filters and the one or more B filters that are correspond to the other two or more colors (colors of R and B in the embodiment) other than the above-described color of G are arranged in each line of the horizontal and vertical directions of the color filter array in the basic array pattern P.

The R filter and the B filter are arranged in each line of the horizontal and vertical directions of the color filter array, so that occurrence of color moire (false color) can be suppressed. As a result, an optical low pass filter to suppress the occurrence of the false color may not be arranged in an optical path that extends from an incidence surface of an optical system to an imaging surface, and even in a case in which an optical low pass filter is employed, the optical low pass filter having a weak effect to cut a high frequency component to inhibit the occurrence of the false color can be employed, so that it is possible to avoid compromising the resolution.

Figure 2:
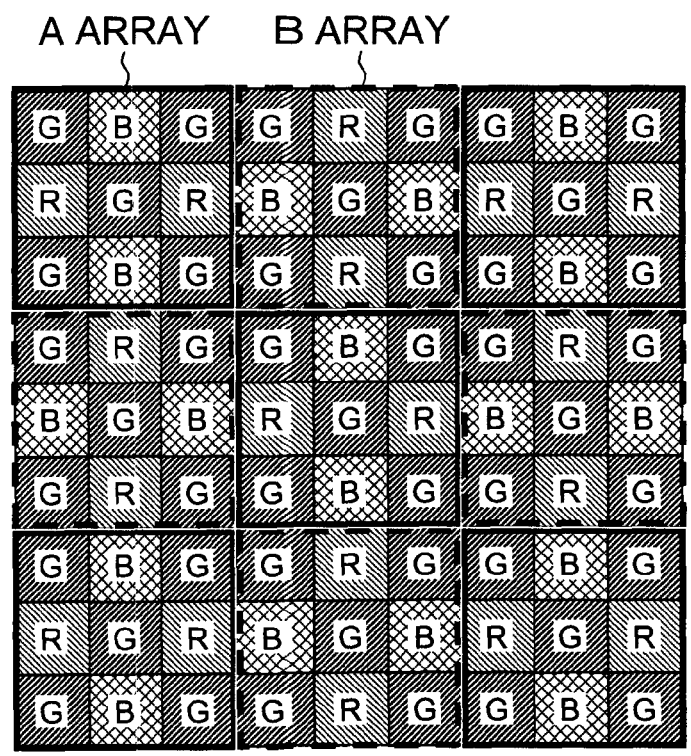
FIG. 2 is a diagram illustrating a state in which a basic array pattern of 6×6 pixels that is included in a color filter array of the color imaging device of the first embodiment is divided into A arrays of 3×3 pixels and B arrays of 3×3, and the arrays are arranged.

As illustrated in FIG. 2, it can be understood that the basic array pattern P includes an array in which an A array of 3×3 pixels that are enclosed by the frame of solid line and a B array of 3×3 pixels that are enclosed by the frame of broken line are alternately arranged in the horizontal direction and the vertical direction.

In each of the A array and the B array, the G filters that are brightness system pixels are arranged at the four corners and the center, and are arranged on the both diagonal lines. In addition, in the A array, the R filters are arranged in the horizontal direction and the B filters are arranged in the vertical direction while sandwiching the G filter that is arranged at the center, and on the other hand, in the B array, the B filters are arranged in the horizontal direction and the R filters are arranged in the vertical direction while sandwiching the G filter that is arranged at the center. That is, in the A array and the B array, positional relationship of the R filter and the B filter is reversed, however, the other arrangements are same.

Figure 3:
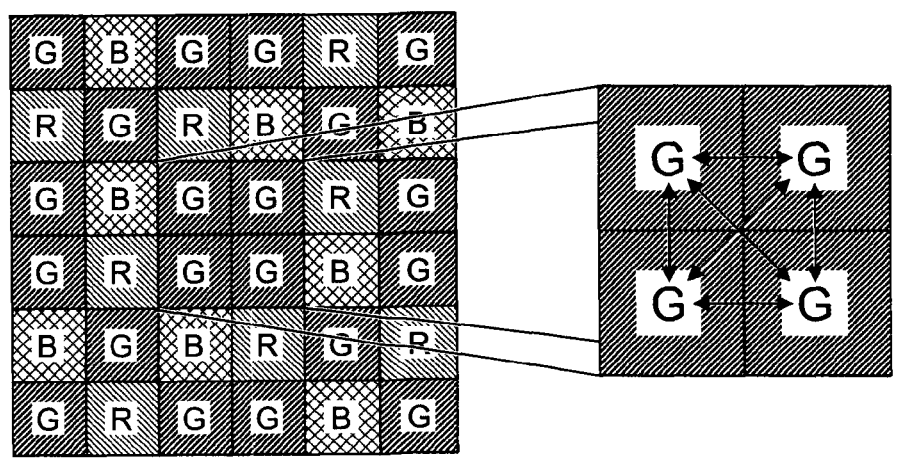
FIG. 3 is a diagram that is used to explain a method of determining a correlation direction from pixel values of the G pixels of 2×2 pixels that are included in the color filter array of the color imaging device of the first embodiment.

In addition, as illustrated in FIG. 3, the G filters that are arranged at the four corners of the A array and the B array correspond to a G filter of a square array of 2×2 pixels by alternately arranging the A array and the B array in the horizontal and vertical directions.

This is why the G filter of the square array that corresponds to 2×2 pixels is formed by arranging the G filters that are brightness system pixels at the four corners and the center in the 3×3 pixels of the A array or the B array, and alternately arranging the 3×3 pixels in the horizontal and vertical directions. Note that, by such an array, the above-described features (1), (2), and (3), and the following feature (5) are satisfied.

(Feature (5))

The color filter array illustrated in FIG. 1 includes a square array that corresponds to 2×2 pixels that are constituted by the G filters.

As illustrated in FIG. 3, it can be determined that there is a correlation in a direction having a small difference absolute value, out of the horizontal direction, the vertical direction, and the diagonal directions by extracting the 2×2 pixels that are constituted by the G filters, and obtaining a difference absolute value between pixel values of G pixels in the horizontal direction, a difference absolute value between pixel values of G pixels in the vertical direction, and a difference absolute value between pixel values of G pixels in the diagonal directions (upper right diagonal and upper left diagonal directions).

That is, in this color filter array, using information of G pixels having a minimum pixel distance, a direction having a high correlation can be determined from the horizontal direction, the vertical direction, and the diagonal directions. This direction determination result can be used for the processing to perform interpolation from the surrounding pixel (synchronization processing).

In addition, as illustrated in FIG. 2, when pixels in the A array or the B array of 3×3 pixels are set as target pixels of the synchronization processing, and 5×5 pixels (local area of the mosaic image) are extracted using the center pixel of the A array or the B array as the center, G pixels of 2×2 pixels exist at each of the four corners of the 5×5 pixels. By using pixel values of the G pixels of 2×2 pixels, determination of a correlation direction in the four directions can be accurately performed by using the information of G pixels of the minimum pixel distance.

(Feature (6))

The basic array pattern of the color filter array illustrated in FIG. 1 is point symmetrical with respect to the center of the basic array pattern (center of the four G filters). In addition, each of the A array and the B array in the basic array pattern is point symmetrical with respect to the G filter that is arranged in the center of each of the A array and the B array. In addition, each of the A array and the B array in the basic array pattern is line symmetrical with respect to a line that passes through the center of each of the A array and the B array (center of the G filter that is arranged at the center).

By such symmetry, the circuit size of a processing circuit that is provided downstream can be reduced and simplified.

As illustrated in FIG. 1, in the basic array pattern P that is indicated by the thick frame, color filter arrays of the first and third lines out of the first to sixth lines in the horizontal direction are G B G G R G, a color filter array of the second line is R G R B G B, color filter arrays of the fourth and sixth lines are G R G G B G, and a color filter array of the fifth line is B G B R G R.

Here, in FIG. 1, in a case in which a basic array pattern that is obtained by shifting the basic array pattern P by one pixel in the horizontal direction and the vertical direction is set as a basic array pattern P', and a basic array pattern that is obtained by shifting the basic array pattern P by two pixels in the horizontal direction and the vertical direction is set as a basic array pattern P'', the same color filter array is obtained even when the basic array patterns P' and P'' are repeatedly arranged in the horizontal direction and the vertical direction.

That is, there is a plurality of basic array patterns that can constitute the color filter array illustrated in FIG. 1 by repeatedly arranging the basic array pattern in the horizontal direction and the vertical direction. In the first embodiment, for convenience, the basic array pattern P in which the basic array pattern is point symmetrical is referred to as a basic array pattern.

Note that, in a color filter array according to the other embodiments that are described below, there is a plurality of basic array patterns for each color filter array, however the typical pattern is referred to as a basic array pattern of the color filter array.

<Second Embodiment>

Figures 4, 5:
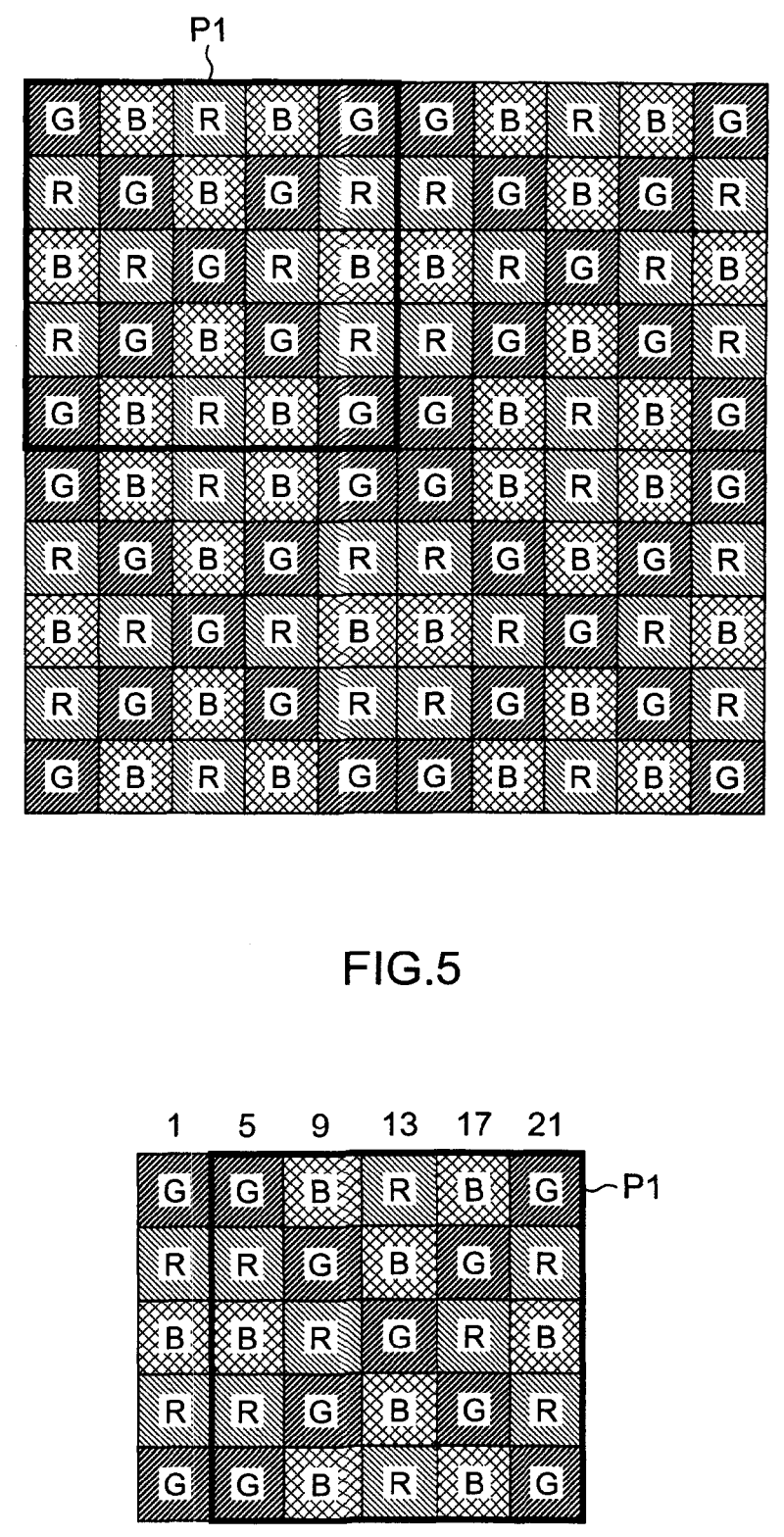

FIG. 4 is a diagram illustrating a second embodiment of the single-panel type color imaging device according to the presently disclosed subject matter, and in particular, a color filter array of color filters that are provided in the color imaging device.

The color filter array of the color imaging device of the second embodiment includes the same features as the features (1), (2), (3), (4), (5), and (6) of the color filter array of the color imaging device of the first embodiment, and a feature (7) that is not included in the color filter array of the color imaging device of the first embodiment. Note that the detailed description of the same features as the features of the color filter array of the color imaging device of the first embodiment is omitted.

(Feature (1))

The color filter array illustrated in FIG. 4 includes the basic array pattern P1 that is constituted by a square array pattern that corresponds to 5×5 pixels (pattern that is indicated by the thick frame), and the basic array pattern P1 is repeatedly arranged in the horizontal direction and the vertical direction.

That is, in the color filter array, the color filters of R, G, and B (the R filter, the G filter, and the B filter) are arranged with a certain cyclic nature.

In the basic array pattern P1, the G filters that are brightness system pixels are arranged on the both diagonal lines. In addition, in the basic array pattern P1, the R filter, the G filter, and the B filter are arranged in the vertical and horizontal directions so as not to be adjacent to each other. Note that the basic array pattern P1 illustrated in FIG. 4 is an example in which the R filter, the G filter, and the B filter are arranged in the vertical and horizontal directions so as not to be adjacent to each other, and the basic array pattern P1 is not limited to such a case.

(Feature (2))

In the color filter array illustrated in FIG. 4, the G filter that corresponds to a color that contributes most to obtaining a brightness signal (color of G in the embodiment) is arranged in each line of the horizontal, vertical, and diagonal (NE and NW) directions of the color filter array. This is an effect that is obtained by arranging the G filters on the both diagonal lines in the basic array pattern having odd number×odd number.

(Feature (3))

In the basic array pattern of the color filter array illustrated in FIG. 4, the number of pixels of the R pixel, the G pixel, and the B pixel that correspond to the R filter, the G filter, and the B filter in the basic array pattern are 8 pixels, 9 pixels, and 8 pixels, respectively. That is, a proportion of the number of R pixels, the number of G pixels, and the number of B pixels is 8:9:8, a ratio of the number of G pixels that help most to obtain a brightness signal is greater than each ratio of the number of R pixels and the number of B pixels that correspond to the colors other than G.

(Feature (4))

In the color filter array illustrated in FIG. 4, the one or more R filters and the one or more B filters that correspond to the two or more colors other than the above-described color of G (colors of R and B in the embodiment) are arranged in each line of the horizontal and vertical directions of the color filter array in the basic array pattern P. This is an effect that is obtained by arranging the R filter, the G filter, and the B filter in the vertical and horizontal directions so as not to be adjacent to each other in the basic array pattern.

(Feature (5))

The color filter array illustrated in FIG. 4 includes a square array that corresponds to 2×2 pixels that are constituted by the G filters. That is, in the basic array pattern P1, because the G pixels are arranged at the four corners, when the two basic array patterns P1 are arranged in the horizontal and vertical directions, that is, four patterns in total, the square array that corresponds to 2×2 pixels that are constituted by the G filters appears at the center part. In addition, when 7×7 pixels (local area of the mosaic image) are extracted using the basic array pattern P1 as the center, the G pixels of 2×2 pixels exist at each of the four corners of the 7×7 pixels.

(Feature (6))

The basic array pattern P1 of the color filter array illustrated in FIG. 4 is point symmetrical with respect to the center of the basic array pattern P1 (center of the four G filters).

In addition, the basic array pattern P1 of the color filter array of FIG. 4 is line symmetrical with respect to the line of the horizontal direction or the vertical direction that passes through the center of the basic array pattern P1 (center of the four G filters).

(Feature (7))

In the color filter array illustrated in FIG. 4, a color filter array that is obtained by down-sampling the color filter array to 1/(N−1) in the horizontal direction or the vertical direction is substantially the same as the original color filter array. That is, a color filter array that is obtained by reading out a line every (N−1) lines in the horizontal direction or the vertical direction is the substantially the same as the original color filter array.

Figures 6, 7:
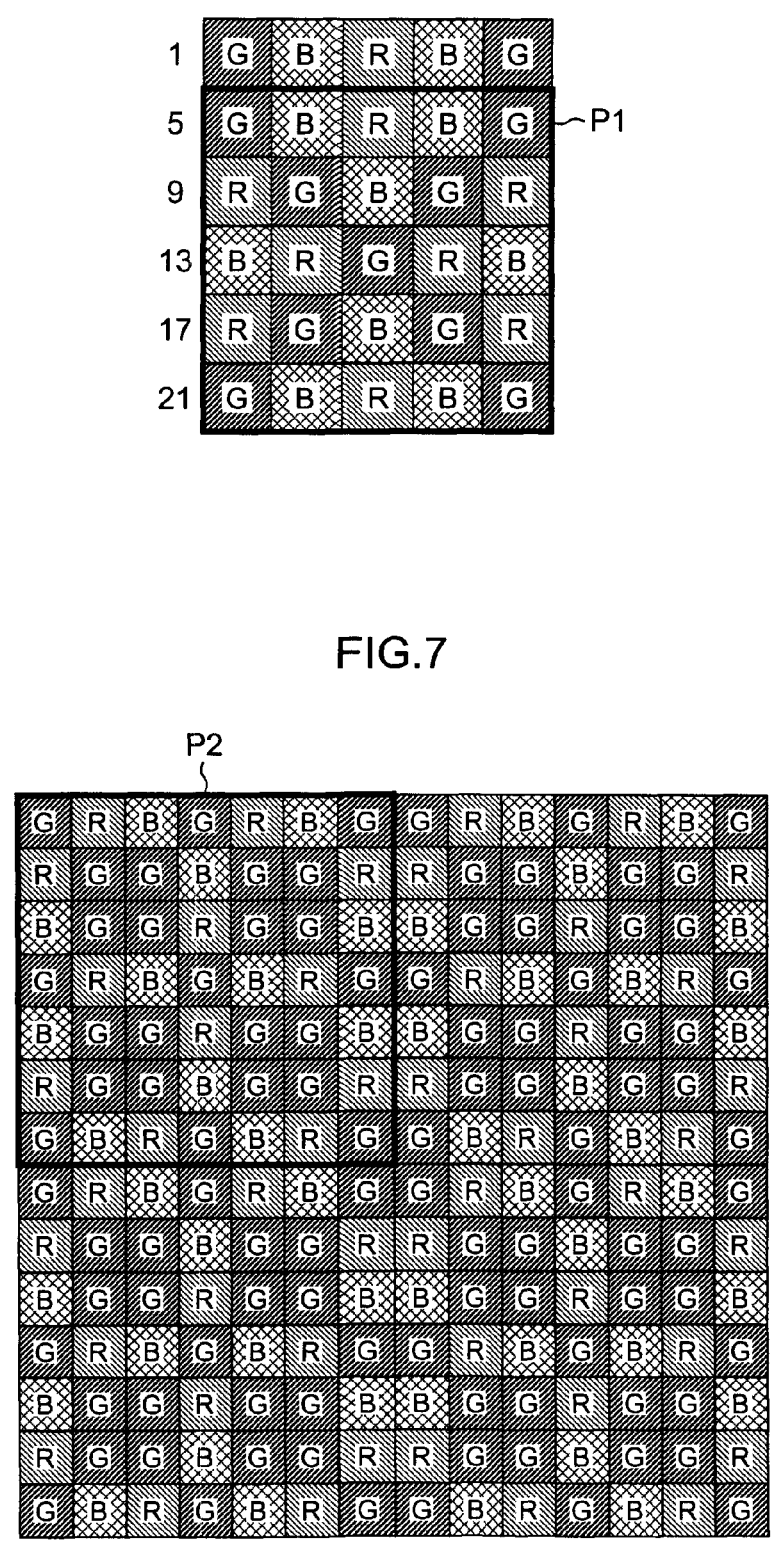

FIG. 5 is a diagram illustrating a color filter array that is obtained by down-sampling and reading out the color filter array illustrated in FIG. 4 to 1/4 (=1/(N−1), N=5) in the horizontal direction. FIG. 6 is a diagram illustrating a color filter array that is obtained by down-sampling and reading out the color filter array illustrated in FIG. 4 to 1/4 (=1/(N−1), N=5) in the vertical direction. Numbers that are assigned in FIG. 5 respectively indicate rows that are extracted when numbers such as the first, second, third, . . . rows are assigned from the upper left of the color filter array illustrated in FIG. 4 in the horizontal direction, and numbers that are assigned in FIG. 6 respectively indicate lines that are extracted when numbers such as the first, second, third, . . . lines are assigned from the upper left of the color filter array illustrated in FIG. 4 in the vertical direction. Note that, in FIG. 5, for explanation, the only first to fifth lines of the color filter array illustrated in FIG. 4 are displayed, and in FIG. 6, for explanation, the only first to fifth rows of the color filter array illustrated in FIG. 4 are displayed.

In the color filter array illustrated in FIG. 5, which is down-sampled to 1/4, the fifth, ninth, 13th, 17th, and 21st rows and the first to fifth lines are included in the basic array pattern P1, and the basic array pattern P1 repeatedly appears in the horizontal and vertical directions. That is, the color filter array illustrated in FIG. 5, which is down-sampled to 1/4 is the same as the original color filter array except for the first row. This is a feature that is obtained when the basic array pattern P1 is line symmetrical with respect to the line of the vertical direction that passes through the center of the basic array pattern P1 (center of the four G filters).

In the color filter array illustrated in FIG. 6, which is down-sampled to 1/4, the fifth, ninth, 13th, 17th, and 21st lines and the first to fifth rows are included in the basic array pattern P1, and the basic array pattern P1 repeatedly appears in horizontal and vertical directions. That is, the color filter array illustrated in FIG. 6, which is down-sampled to 1/4 is the same as the original color filter array except for the first row. This is a feature that is obtained when the basic array pattern P1 is line symmetrical with respect to the line of the horizontal direction that passes through the center of the basic array pattern P1 (center of the four G filters).

At the time of capturing a still image, an image is obtained using all pixels, however, at the time of capturing a moving image, an image is obtained by down-sampling a color filter array because high-speed processing is desired. The original color filter array and a color filter array that is obtained by down-sampling the color filter array are substantially the same by performing down-sampling and reading out to 1/(N−1) at the time of capturing a moving image. As a result, the imaging processing at the time of capturing a still image and the imaging processing at the time of capturing a moving image can be set as common processing.

Note that, in the embodiment, the basic array pattern P1 is used in which the G filters are arranged on the diagonal lines, and the R filter and the B filter are arranged in each of the horizontal and vertical directions so as not to be adjacent to each other, however, the pattern is an example, and the basic array pattern of 5×5 pixels, which satisfies the features (1) to (6) is not limited to such a case.

<Third Embodiment>

FIG. 7 is a diagram illustrating a third embodiment of the single-panel type color imaging device according to the presently disclosed subject matter, in particular, a color filter array of color filters that are provided in the color imaging device. The color filter array of the color imaging device of the third embodiment includes the same features as the features (1), (2), (3), (4), (5), and (6) of the color filter array of the color imaging device of the first embodiment, and a feature (8) that is not included in the color filter array of the color imaging device of the first embodiment. Note that the detailed description of the same features as the features of the color filter array of the color imaging device of the first embodiment is omitted.

(Feature (1))

In the color filter array illustrated in FIG. 7, a basic array pattern P2 that is constituted by a square array pattern that corresponds to 7×7 pixels is repeatedly arranged in the horizontal and vertical directions. In such basic array pattern, the G filters that are brightness system pixels are arranged on at least the both diagonal lines. That is, in such a color filter array, the color filters of R, G, and B (the R filter, the G filter, and the B filter) are arranged with a certain cycle nature.

(Feature (2))

In the color filter array illustrated in FIG. 7, the G filter that corresponds to a color that contributes most to obtaining a brightness signal (color of G in the embodiment) is arranged in each line of the horizontal, vertical, and diagonal (NE and NW) directions of the color filter array.

(Feature (3))

In the basic array pattern P2 of the color filter array illustrated in FIG. 7, the number of pixels of the R pixel, the G pixel, and the B pixel that correspond to the R filter, the G filter, and the B filter in the basic array pattern P2 are 12 pixels, 25 pixels, and 12 pixels, respectively. That is, a proportion of the number of R pixels, the number of G pixels, and the number of B pixels is 12:25:12, and a ratio of the number of G pixels that help most to obtain a brightness signal is greater than each ratio of the number of R pixels and the number of B pixels that correspond to the colors other than G.

(Feature (4))

In the color filter array illustrated in FIG. 7, the one or more R filters and the one or more B filters that respectively correspond to the two or more colors other than the above-described color of G (colors of R and B in the embodiment) are arranged in each line of the horizontal and vertical directions of the color filter array in the basic array pattern P2. In the basic array pattern P2, the R filter, the G filter, and the B filter are arranged in each of the vertical and horizontal directions so as not to be adjacent to each other, however, the basic array pattern that satisfies the feature (4) can be created easily by arranging the color filters as described above.

(Feature (5))

The color filter array illustrated in FIG. 7 includes a square array that corresponds to 2×2 pixels that are constituted by the G filters. That is, in the basic array pattern P2, because the G pixels are arranged at the four corners, when the two basic array patterns P2 are arranged in the horizontal and vertical directions, that is, four patterns in total, the square array that corresponds to 2×2 pixels that are constituted by the G filters appears at least at the center part.

(Feature (6))

The basic array pattern P2 of the color filter array illustrated in FIG. 7 is point symmetrical with respect to the center of the basic array pattern P2 (center of the four G filters).

(Feature (8))

In the color filter array illustrated in FIG. 7, an array of the G filters in a color filter array that is obtained by down-sampling the color filter array to 1/(N−1) in the horizontal direction or the vertical direction is substantially the same as an array of the G filters in the original color filter array. That is, an array of the G filters in a color filter array that is obtained by reading out a line every (N−1) lines in the horizontal direction or the vertical direction is substantially the same as an array of the G filters in the original color filter array.

Figure 10:
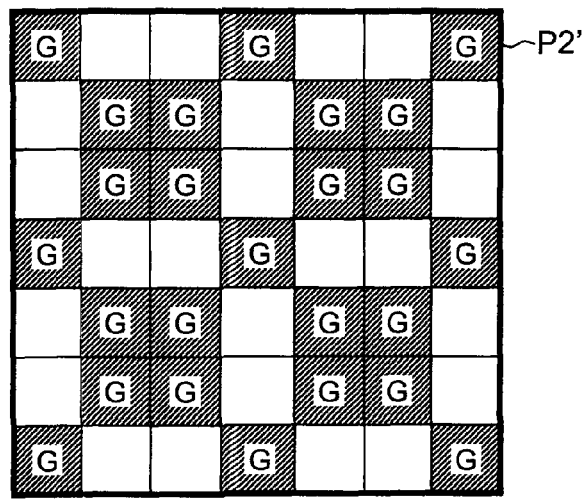
FIG. 10 is a diagram illustrating the only G pixels of the color filter array that is obtained by down-sampling the color imaging device of the third embodiment to 1/(N−1)

FIG. 8 is a diagram illustrating a color filter array that is obtained by down-sampling and reading out the color filter array illustrated in FIG. 4 to 1/6 (=1/(N−1), N=7) in the horizontal direction. In addition, FIG. 9 is a diagram illustrating a color filter array that is obtained by down-sampling and reading out the color filter array illustrated in FIG. 4 to 1/6 (=1/(N−1), N=7) in the vertical direction. Numbers that are assigned in FIG. 8 respectively indicate rows that are extracted when numbers such as the first, second, third, . . . rows are assigned from the upper left of the color filter array illustrated in FIG. 7 in the horizontal direction, and numbers that are assigned in FIG. 9 respectively indicate lines that are extracted when numbers such as the first, second, third, . . . lines are assigned from the upper left of the color filter array illustrated in FIG. 7 in the vertical direction. Note that, in FIG. 8, for explanation, the only first to seventh lines of the color filter array illustrated in FIG. 7 are displayed, and in FIG. 9, for explanation, the only first to seventh rows of the color filter array illustrated in FIG. 7 are displayed. Note that FIG. 10 is a diagram illustrating the only G filters of array patterns P2' illustrated in FIG. 8 and FIG. 9.

In the color filter array illustrated in FIG. 8, which is down-sampled to 1/6, an array of the G filters in the array pattern P2' that includes the seventh, 13th, 19th, 25th, 31st, 37th, and 43rd rows and the first to fifth lines (see FIG. 10) is the same as an array of the G filters in the basic array pattern P2. The array pattern P2' repeatedly appears in the horizontal and vertical directions. That is, the color filter array illustrated in FIG. 8, which is down-sampled to 1/6 is the same as the original color filter array except for the first row.

In the color filter array illustrated in FIG. 9, which is down-sampled to 1/6, an array of the G filters in the array pattern P2' that includes the seventh, 13th, 19th, 25th, 31st, 37th, and 43rd lines and the first to fifth rows (see FIG. 10) is the same as the array of the G filters in the basic array pattern P2. The array pattern P2' repeatedly appears in the horizontal and vertical directions. That is, the color filter array illustrated in FIG. 9, which is down-sampled to 1/6 is the same as the original color filter array except for the first row.

As described above, the G filters are arranged so that an array of the G filters in the original color filter array is substantially the same as an array of the G filters in a color filter array that is obtained by down-sampling the color filter array to 1/(N−1) in the horizontal direction or the vertical direction. That is, before and after down-sampling and reading out to 1/(N−1), positional relationship between the G filters that are brightness system pixels and the other color filters (the R filter and the B filter) is the same. As described above, when the arrangements of the G pixels that are the main of the imaging processing are substantially the same, load of the imaging processing can be reduced. In addition, improvement of the image quality is also facilitated.

<Fourth Embodiment>

Figure 11:
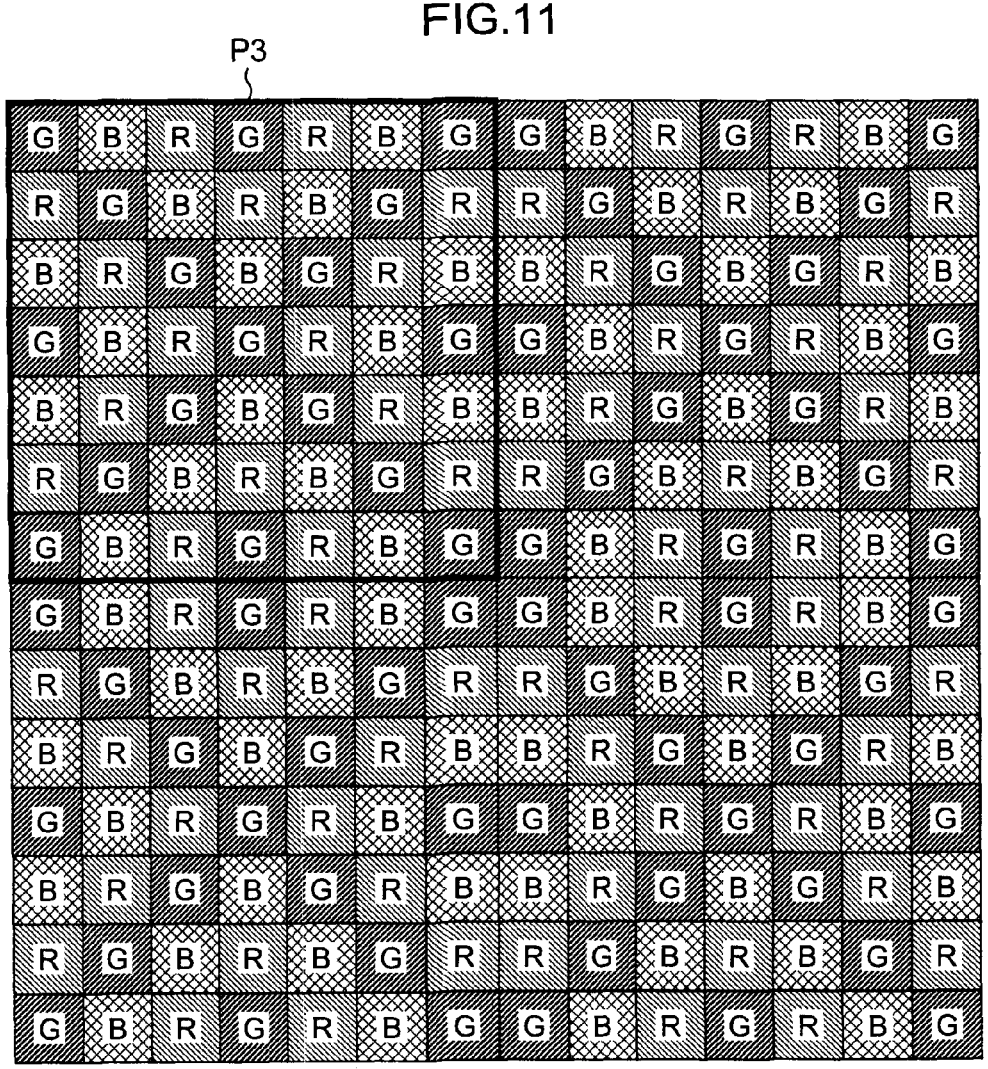
FIG. 11 is a diagram illustrating a fourth embodiment of the single-panel type color imaging device according to the presently disclosed subject matter.

FIG. 11 is a diagram illustrating a fourth embodiment of the single-panel type color imaging device according to the presently disclosed subject matter, in particular, a color filter array of color filters that are provided in the color imaging device. The color filter array of the color imaging device of the fourth embodiment includes the same features as the features (1), (2), (3), (4), (5), and (6) of the color filter array of the color imaging device of the first embodiment, and the feature (7) that is not included in the color filter array of the color imaging device of the first embodiment. Note that the detailed description of the same features as the features of the color filter array of the color imaging device of the first embodiment and the second embodiment is omitted.

(Feature (1))

The color filter array illustrated in FIG. 11 includes a basic array pattern P3 (pattern that is indicated by the thick frame) that is constituted by a square array pattern that corresponds to 7×7 pixels, and the basic array pattern P3 is repeatedly arranged in the horizontal and vertical directions. In the basic array pattern P3, the G filters that are brightness system pixels are arranged on at least the both diagonal lines. That is, in the color filter array, the color filters of R, G, and B (the R filter, the G filter, and the B filter) are arranged with a certain cycle nature.

(Feature (2))

In the color filter array illustrated in FIG. 11, the G filter that corresponds to a color that contributes most to obtaining a brightness signal (color of G in the embodiment) is arranged in each line of the horizontal, vertical, and diagonal (NE and NW) directions of the color filter array.

(Feature (3))

In the basic array pattern P3 of the color filter array illustrated in FIG. 11, the number of pixels of the R pixel, the G pixel, and the B pixel that correspond to the R filter, the G filter, and the B filter in the basic array pattern are 16 pixels, 17 pixels, and 16 pixels, respectively, and a ratio of the number of G pixels that help most to obtain a brightness signal is greater than each ratio of the number of R pixels and the number of B pixels that correspond to the other colors.

(Feature (4))

In the color filter array illustrated in FIG. 11, the one or more R filters and the one or more B filters that respectively correspond to the two or more colors other than the above-described color of G (colors of R and B in the embodiment) are arranged in each line of the horizontal and vertical directions of the color filter array in the basic array pattern P.

In the basic array pattern P3, the R filter, the G filter, and the B filter are arranged in each of the vertical and horizontal directions so as not to be adjacent to each other, however, a basic array pattern that satisfies the feature (4) can be created easily by arranging the color filters as described above.

(Feature (5))

The basic array pattern P3 of the color filter array illustrated in FIG. 11 includes a square array that corresponds to 2×2 pixels that are constituted by the G filters. That is, in the basic array pattern P1, because the G pixels are arranged at the four corners, when the two basic array patterns P1 are arranged in the horizontal and vertical directions, that is, four patterns in total, the square array that corresponds to 2×2 pixels that are constituted by the G filters appears at the center part.

(Feature (6))

The basic array pattern P3 of the color filter array illustrated in FIG. 11 is point symmetrical with respect to the center of the basic array pattern P (center of the four G filters). In addition, the basic array pattern P3 is line symmetrical with respect to the lines of the horizontal and vertical directions that pass through the center of the basic array pattern P3 (center of the G filter that is arranged at the center).

(Feature (7))

The basic array pattern P3 of the color filter array illustrated in FIG. 11 is line symmetrical with respect to the lines of the horizontal and vertical directions that pass through the center of the basic array pattern P3 (center of the G filter that is arranged at the center). Thus, in the color filter array illustrated in FIG. 11, a color filter array that is obtained by down-sampling and reading out the color filter array to 1/6 (=1/(N−1), N=7) in the horizontal direction or the vertical direction is substantially the same as the original color filter array.

Note that the basic array pattern P3 is an example of a basic array pattern that satisfies the features (1) to (6) and in which the G filters are arranged on the diagonal lines, and the R filter, the G filter, and the B filter are arranged in the vertical direction so as not to be adjacent to each other, and the basic array pattern P3 is not limited to such a case.

<Fifth Embodiment>

Figure 12:
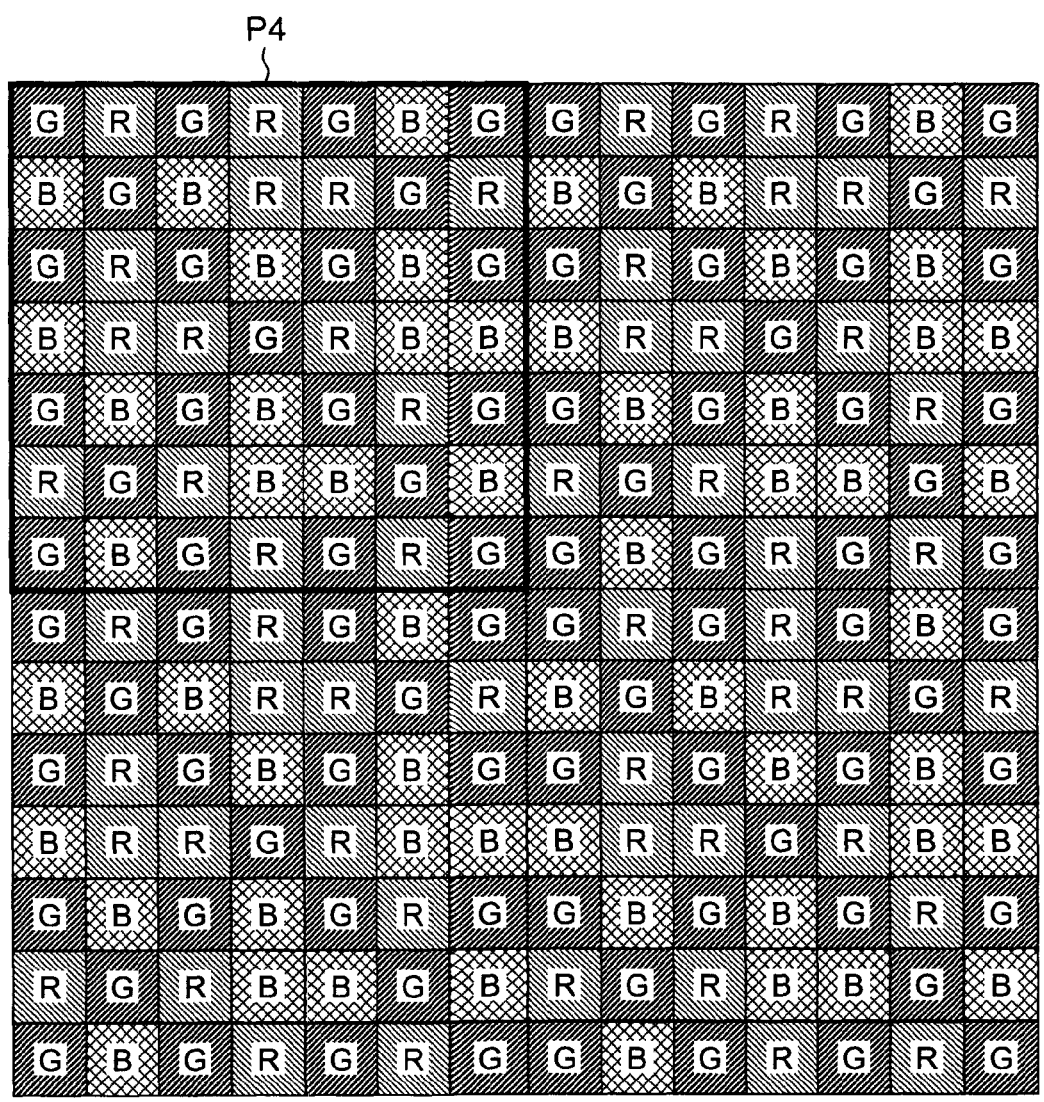
FIG. 12 is a diagram illustrating a fifth embodiment of the single-panel type color imaging device according to the presently disclosed subject matter.

FIG. 12 is a diagram illustrating a fifth embodiment of the single-panel type color imaging device according to the presently disclosed subject matter, in particular, a color filter array of color filters that are provided in the color imaging device.

The color filter array of the color imaging device of the fifth embodiment includes the same features as the features (1), (2), (3), (4), and (5) of the color filter array of the color imaging device of the first embodiment, and a feature (8) that is not included in the color filter array of the color imaging device of the first embodiment. Note that the detailed description of the same features as the features of the color filter array of the color imaging device of the first embodiment and the third embodiment is omitted.

(Feature (1))

The color filter array illustrated in FIG. 12 includes a basic array pattern P4 (pattern that is indicated by the thick frame) that is constituted by a square array pattern that corresponds to 7×7 pixels, and the basic array pattern P4 is repeatedly arranged in the horizontal and vertical directions. In the basic array pattern P4, the G filters that are brightness system pixels are arranged on at least the both diagonal lines. That is, in the color filter array, the color filters of R, G, and B (the R filter, the G filter, and the B filter) are arranged with a certain cycle nature.

However, in the basic array pattern P4, the color filters of R and B (the R filter and the B filter) are arranged irregularly. As a result, the false color can be reduced.

(Feature (2))

In the color filter array illustrated in FIG. 12, the G filter that corresponds to a color that contributes most to obtaining a brightness signal (color of G in the embodiment) is arranged in each line of the horizontal, vertical, and diagonal (NE and NW) directions of the color filter array.

(Feature (3))

In the basic array pattern P4 of the color filter array illustrated in FIG. 12, the number of pixels of the R pixel, the G pixel, and the B pixel that correspond to the R filter, the G filter, and the B filter in the basic array pattern are 14 pixels, 21 pixels, and 14 pixels, respectively, and a ratio of the number of G pixels that help most to obtain a brightness signal is greater than each ratio of the number of R pixels and the number of B pixels that correspond to the colors other than G.

(Feature (4))

In the color filter array illustrated in FIG. 12, the one or more R filters and the one or more B filter that respectively correspond to the two or more colors other than the above-described color of G (colors of R and B in the embodiment) are arranged in each line of the horizontal and vertical directions of the color filter array in the basic array pattern P2.

(Feature (5))

The color filter array illustrated in FIG. 12 includes a square array that corresponds to 2×2 pixels that are constituted by the G filters. That is, in the basic array pattern P4, because the G pixels are arranged at the four corners, when the two basic array patterns P1 are arranged in the horizontal and vertical directions, that is, four patterns in total, the square array that corresponds to 2×2 pixels that are constituted by the G filters appears at the center part.

(Feature (8))

The basic array pattern P4 of the color filter array illustrated in FIG. 12 is not line symmetrical with respect to any of the lines of the horizontal, vertical, upper right diagonal, and lower right diagonal directions that pass through the G filter that is arranged in the center, in the basic array pattern P4. Thus, in the color filter array illustrated in FIG. 12, an array of the G filters in a color filter array that is obtained by down-sampling and reading out the color filter array to 1/6 (=1/(N−1), N=7) in the horizontal direction or the vertical direction is substantially the same as an array of the G filters in the original color filter array.

<Sixth Embodiment>

Figure 13:
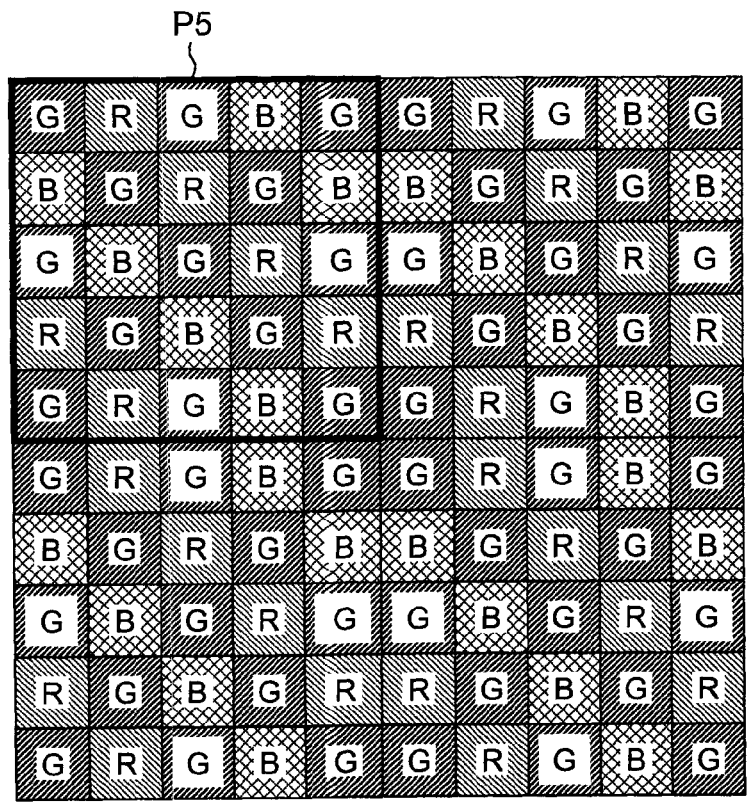
FIG. 13 is a diagram illustrating a sixth embodiment of the single-panel type color imaging device according to the presently disclosed subject matter.

FIG. 13 is a diagram illustrating a sixth embodiment of the single-panel type color imaging device according to the presently disclosed subject matter, in particular, a color filter array of color filters that are provided in the color imaging device.

The color filter array of the color imaging device of the sixth embodiment includes the same features as the features (1), (2), (3), (4), (5), and (6) of the color filter array of the color imaging device of the first embodiment, and the feature (8) that is not included in the color filter array of the color imaging device of the first embodiment. Note that the detailed description of the same features as the features of the color filter array of the color imaging device of the first embodiment and the third embodiment is omitted.

(Feature (1))

In the color filter array illustrated in FIG. 13, a basic array pattern P5 that is constituted by a square array pattern that corresponds to 5×5 pixels is repeatedly arranged in the horizontal and vertical directions. In the basic array pattern P5, the G filters that are brightness system pixels are arranged in a checkered pattern. Note that the checkered pattern can be also called a checker pattern.

Figure 14:
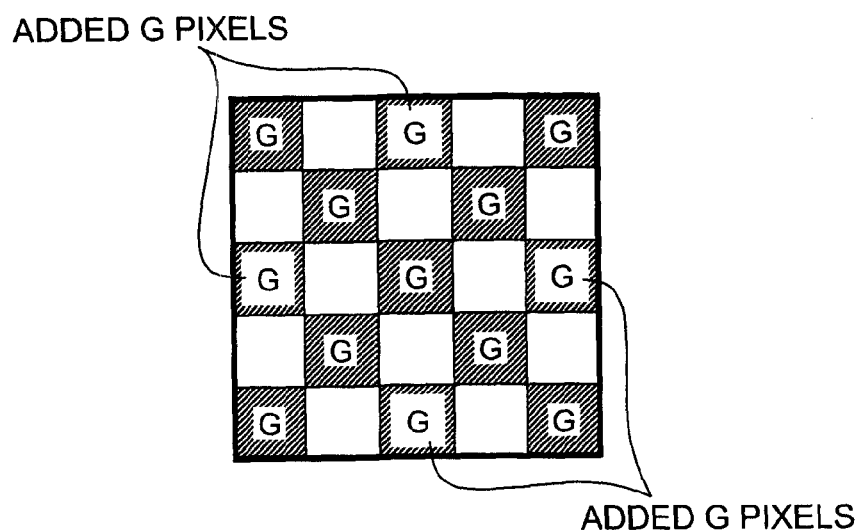
FIG. 14 is a diagram illustrating the only G pixels of a basic array pattern in a color filter array of the color imaging device of the sixth embodiment.

FIG. 14 is a diagram illustrating the only G pixels in the basic array pattern P5. As illustrated in FIG. 14, in the basic array pattern P5, the G filters are arranged on the two diagonal lines, similar to the basic array pattern P2, and also arranged at the middles of each of the four sides.

In addition, as illustrated in FIG. 13, the R filter, the G filter, and the B filter are respectively arranged along the lower right diagonal directions. That is, in the color filter array, the color filters of R, G, and B (the R filter, the G filter, and the B filter) are arranged with a certain cycle nature.

(Feature (2))

In the color filter array illustrated in FIG. 13, the G filter that corresponds to a color that contributes most to obtaining a brightness signal (color of G in the embodiment) is arranged in each line of the horizontal, vertical, and diagonal (NE and NW) directions in the color filter array. Note that "NE" indicates an upper right diagonal direction, and "NW" indicates a lower right diagonal direction. This is an effect that is obtained by arranging the G filters on at least the two diagonal lines in the basic array pattern of odd number×odd number pixels.

(Feature (3))

In the basic array pattern P5 of the color filter array illustrated in FIG. 13, the number of pixels of the R pixel, the G pixel, and the B pixel that correspond to the R filter, the G filter, and the B filter in the basic array pattern P5 are 6 pixels, 13 pixels, and 6 pixels, respectively, and a ratio of the number of G pixels that help most to obtain a brightness signal is greater than each ratio of the number of R pixels and the number of B pixels that correspond to the colors other than G. The ratio of the number of G pixels can be increased to substantially the same extent as the total number of pixels that correspond to the colors other than the color of G by arranging the G filters in a checkered pattern.

(Feature (4))

In the color filter array illustrated in FIG. 13, the one or more R filters and the one or more B filters that respectively correspond to the two or more colors other than the above-described color of G (colors of R and B in the embodiment) are arranged in each line of the horizontal and vertical directions of the color filter array in the basic array pattern P5.

(Feature (5))

The color filter array illustrated in FIG. 13 includes a square array that corresponds to 2×2 pixels that are constituted by the G filters. That is, in the basic array pattern P5, because the G pixels are arranged at the four corners, when the two basic array patterns P5 are arranged in the horizontal and vertical directions, that is, four patterns in total, the square array that corresponds to 2×2 pixels that are constituted by the G filters appears at the center part.

(Feature (6))

The basic array pattern P5 of the color filter array illustrated in FIG. 13 is line symmetrical with respect to an upper right diagonal line that passes through the center of the basic array pattern P5 (center of the G filter that is arranged at the center).

(Feature (8))

The basic array pattern P5 of the color filter array illustrated in FIG. 13 is not line symmetrical with respect to the line of the horizontal direction or the vertical direction that passes through the center of the G filter that is arranged at the center of the basic array pattern P5. Thus, in the basic array pattern P5 of the color filter array illustrated in FIG. 13, an array of the G filters in a color filter array that is obtained by down-sampling the color filter array to 1/4 (=1/(N−1), N=5) in the horizontal direction or the vertical direction is substantially the same as an array of the G filters in the original color filter array.

Note that, in the embodiment, the G filters are arranged in the checkered pattern, and the R filter, the G filter, and the B filter are respectively arranged along the lower right diagonal directions, however, the array is an example, and there are a lot of methods of arranging the G filters in the checkered pattern while respectively arranging the R filter, the G filter, and the B filter along the diagonal directions, and all of the methods can obtain the same feature.

<Seventh Embodiment>

Figure 15:
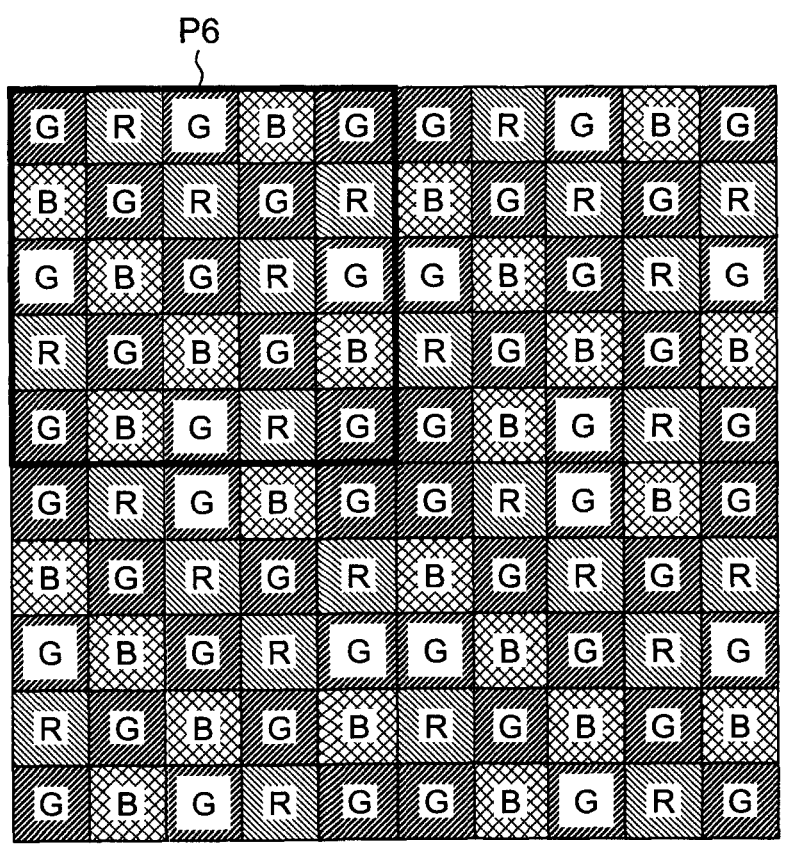
FIG. 15 is a diagram illustrating a seventh embodiment of the single-panel type color imaging device according to the presently disclosed subject matter.

FIG. 15 is a diagram illustrating a seventh embodiment of the single-panel type color imaging device according to the presently disclosed subject matter, in particular, a color filter array of color filters that are provided in the color imaging device.

The color filter array of the color imaging device of the seventh embodiment includes the same features as the features (1), (2), (3), (4), and (5) of the color filter array of the color imaging device of the first embodiment, and the feature (8) that is not included in the color filter array of the color imaging device of the first embodiment. Note that the detailed description of the same features as the features of the color filter array of the color imaging device of the first embodiment and the third embodiment is omitted.

(Feature (1))

The color filter array illustrated in FIG. 15 includes a basic array pattern P6 (pattern that is indicated by the thick frame) that is constituted by a square array pattern that corresponds to 5×5 pixels, and the basic array pattern P6 is repeatedly arranged in the horizontal and vertical directions.

Similar to the basic array pattern P5, in the basic array pattern P6, the G filters that are brightness system pixels are arranged in a checkered pattern, that is, the G filters are arranged on the both diagonal lines and arranged at the middles of each of the four sides. That is, in the color filter array, the color filters of R, G, and B (the R filter, the G filter, and the B filter) are arranged with a certain cycle nature.

However, in the basic array pattern P6, the color filters of R and B (the R filter and the B filter) are arranged irregularly. As a result, the false color can be reduced.

(Feature (2))

In the color filter array illustrated in FIG. 15, the G filter that corresponds to a color that contributes most to obtaining a brightness signal (color of G in the embodiment) is arranged in each line of the horizontal, vertical, and diagonal (NE and NW) directions of the color filter array.

(Feature (3))

Similar to the basic array pattern P5, in the basic array pattern P6 of the color filter array illustrated in FIG. 15, the number of pixels of the R pixel, the G pixel, and the B pixel that correspond to the R filter, the G filter, and the B filter in the basic array pattern are 6 pixels, 13 pixels, and 6 pixels, respectively. That is, a ratio of the number of G pixels that help most to obtain a brightness signal is greater than each ratio of the number of R pixels and the number of B pixels that correspond to the colors other than G.

(Feature (4))

In the color filter array illustrated in FIG. 15, the one or more R filters and the one or more B filters that respectively correspond to the two or more colors other than the above-described color of G (colors of R and B in the embodiment) are arranged in each line of the horizontal and vertical directions of the color filter array in the basic array pattern P6.

(Feature (5))

The color filter array illustrated in FIG. 15 includes a square array that corresponds to 2×2 pixels that are constituted by the G filters. That is, in the basic array pattern P4, because the G pixels are arranged at the four corners, when the two basic array patterns P4 are arranged in the horizontal and vertical directions, that is, four patterns in total, the square array that corresponds to 2×2 pixels that are constituted by the G filters appears at the center part.

(Feature (8))

The basic array pattern P6 of the color filter array illustrated in FIG. 15 is not line symmetrical with respect to the line of the horizontal direction or the vertical direction that passes through the center of the G filter that is arranged at the center of the basic array pattern P6. Thus, in the basic array pattern P6 of the color filter array illustrated in FIG. 15, an array of the G filters in a color filter array that is obtained by down-sampling and reading out the color filter array to 1/4 (=1/(N−1), N=5) in the horizontal direction or the vertical direction is substantially the same as an array of the G filters in the original color filter array.

<Eighth Embodiment>

Figure 16:
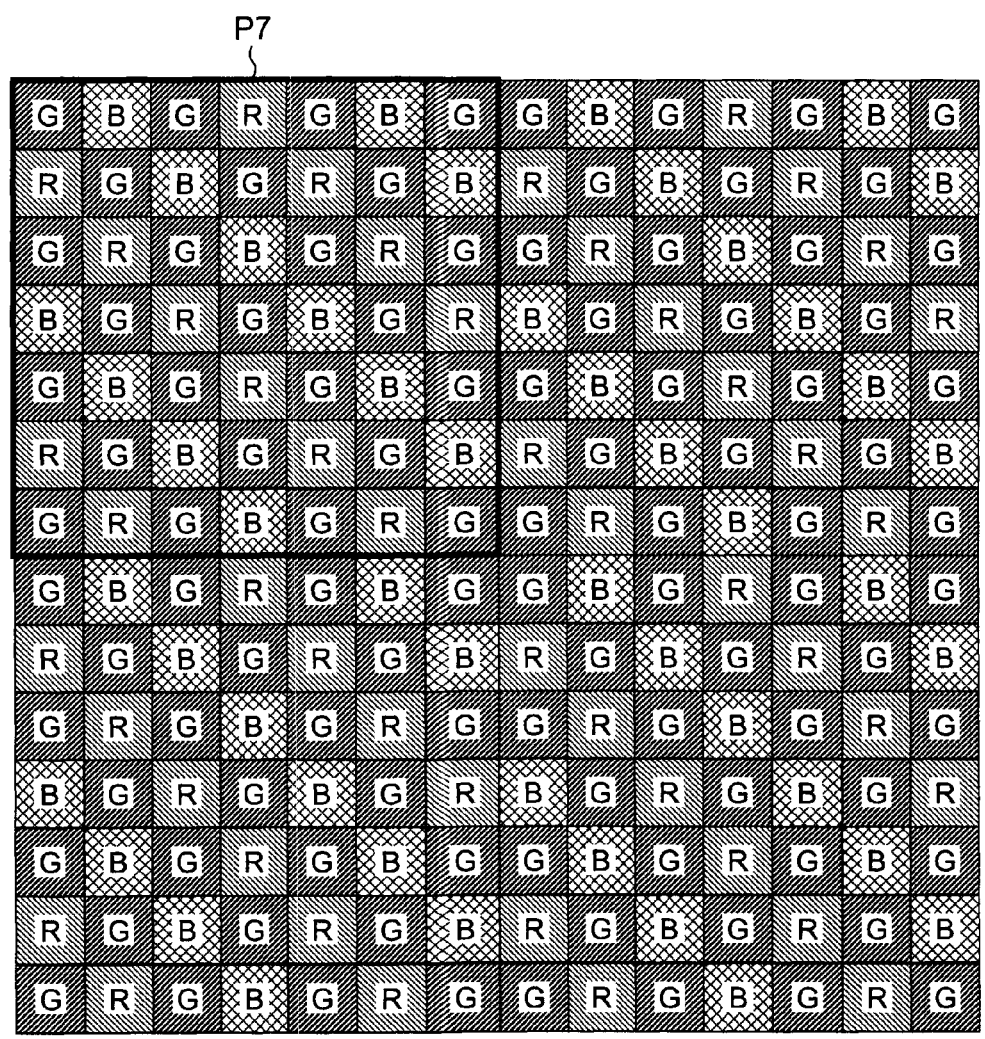
FIG. 16 is a diagram illustrating an eighth embodiment of the single-panel type color imaging device according to the presently disclosed subject matter.

FIG. 16 is a diagram illustrating an eighth embodiment of the single-panel type color imaging device according to the presently disclosed subject matter, in particular, a color filter array of color filters that are provided in the color imaging device.

The color filter array of the color imaging device of the eighth embodiment includes the same features as the features (1), (2), (3), (4), (5), and (6) of the color filter array of the color imaging device of the first embodiment, and the feature (8) that is not included in the color filter array of the color imaging device of the first embodiment. Note that the detailed description of the same features as the features of the color filter array of the color imaging device of the first embodiment and the third embodiment is omitted.

(Feature (1))

In the color filter array illustrated in FIG. 16, a basic array pattern P7 that is constituted by a square array pattern that corresponds to 7×7 pixels is repeatedly arranged in the horizontal and vertical directions. In the basic array pattern P7, the G filters that are brightness system pixels are arranged in a checkered pattern.

Figure 17:
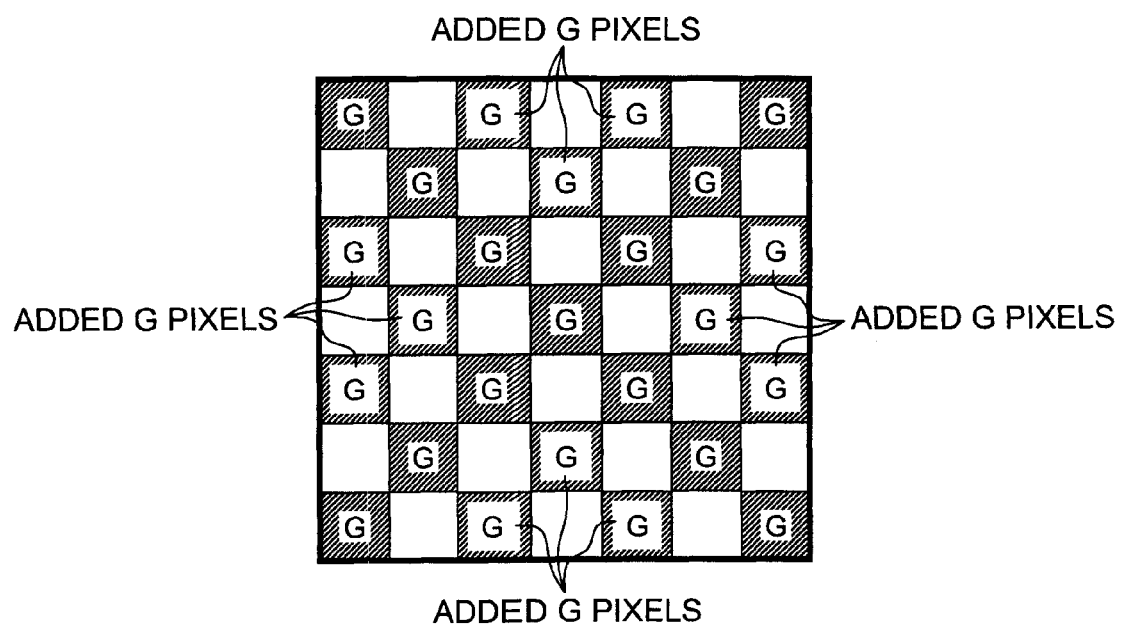
FIG. 17 is a diagram illustrating the only G pixels of a basic array pattern in a color filter array of the color imaging device of the eighth embodiment.

FIG. 17 is a diagram illustrating the only G filters of the basic array pattern P7. As illustrated in FIG. 17, in the basic array pattern P7, the G filters are arranged on the two diagonal lines similar to the basic array pattern P2, and the three G filters are also arranged at the middles of each of the four sides.

In addition, as illustrated in FIG. 16, the R filter, the G filter, and the B filter are respectively arranged along the lower right diagonal directions. That is, in the color filter array, the color filters of R, G, and B (the R filter, the G filter, and the B filter) are arranged with a certain cycle nature.

(Feature (2))

In the color filter array illustrated in FIG. 16, the G filter that corresponds to a color that contributes most to obtaining a brightness signal (color of G in the embodiment) is arranged in each line of the horizontal, vertical, and diagonal (NE and NW) directions of the color filter array. This is an effect that is obtained by arranging the G filters on at least the two diagonal lines in the basic array pattern of odd number×odd number pixels.

(Feature (3))

In the basic array pattern P7 of the color filter array illustrated in FIG. 16, the number of pixels of the R pixel, the G pixel, and the B pixel that correspond to the R filter, the G filter, and the B filter in the basic array pattern P7 are 12 pixels, 25 pixels, 12 pixels, respectively, a ratio of the number of G pixels that help most to obtain a brightness signal is greater than each ratio of the number of R pixels and the number of B pixels that correspond to the colors other than G. The ratio of the number of G pixels can be increased to substantially the same extent as the total number of pixels that correspond to the colors other than the color of G by arranging the G filters in the checkered pattern.

(Feature (4))

In the color filter array illustrated in FIG. 16, the one or more R filters and the one or more B filters that respectively correspond to the two or more colors other than the above-described color of G (colors of R and B in the embodiment) are arranged in each line of the horizontal and vertical directions of the color filter array in the basic array pattern P7.

(Feature (5))

The color filter array illustrated in FIG. 16 includes a square array that corresponds to 2×2 pixels that are constituted by the G filters. That is, in the basic array pattern P7, because the G pixels are arranged at the four corners, when the two basic array patterns P5 are arranged in the horizontal and vertical directions, that is, four patterns in total, the square array that corresponds to 2×2 pixels that are constituted by the G filters appears at the center part.

(Feature (6))

The basic array pattern P7 of the color filter array illustrated in FIG. 16 is line symmetrical with respect to the upper right diagonal line that passes through the center of the basic array pattern P7 (center of the G filter that is arranged at the center).

(Feature (8))

The basic array pattern P7 of the color filter array illustrated in FIG. 16 is not line symmetrical with respect to the line of the horizontal direction or the vertical direction that passes through the center of the G filter that is arranged at the center of the basic array pattern P7. Thus, in the basic array pattern P7 of the color filter array illustrated in FIG. 16, an array of the G filters in a color filter array that is obtained by down-sampling and reading out the color filter array to 1/6 (=1/(N−1), N=7) in the horizontal direction or the vertical direction is substantially the same as an array of the G filters in the original color filter array.

Note that, in the embodiment, the G filters are arranged in a checkered pattern, and the R filter, the G filter, and the B filter are respectively arranged along the lower right diagonal directions, however, the array is an example, and there is a lot of methods of arranging the G filters in a checkered pattern while respectively arranging the R filter, the G filter, and the B filter along the diagonal directions, and all of the methods can obtain the same feature.

<Ninth Embodiment>

Figure 18:
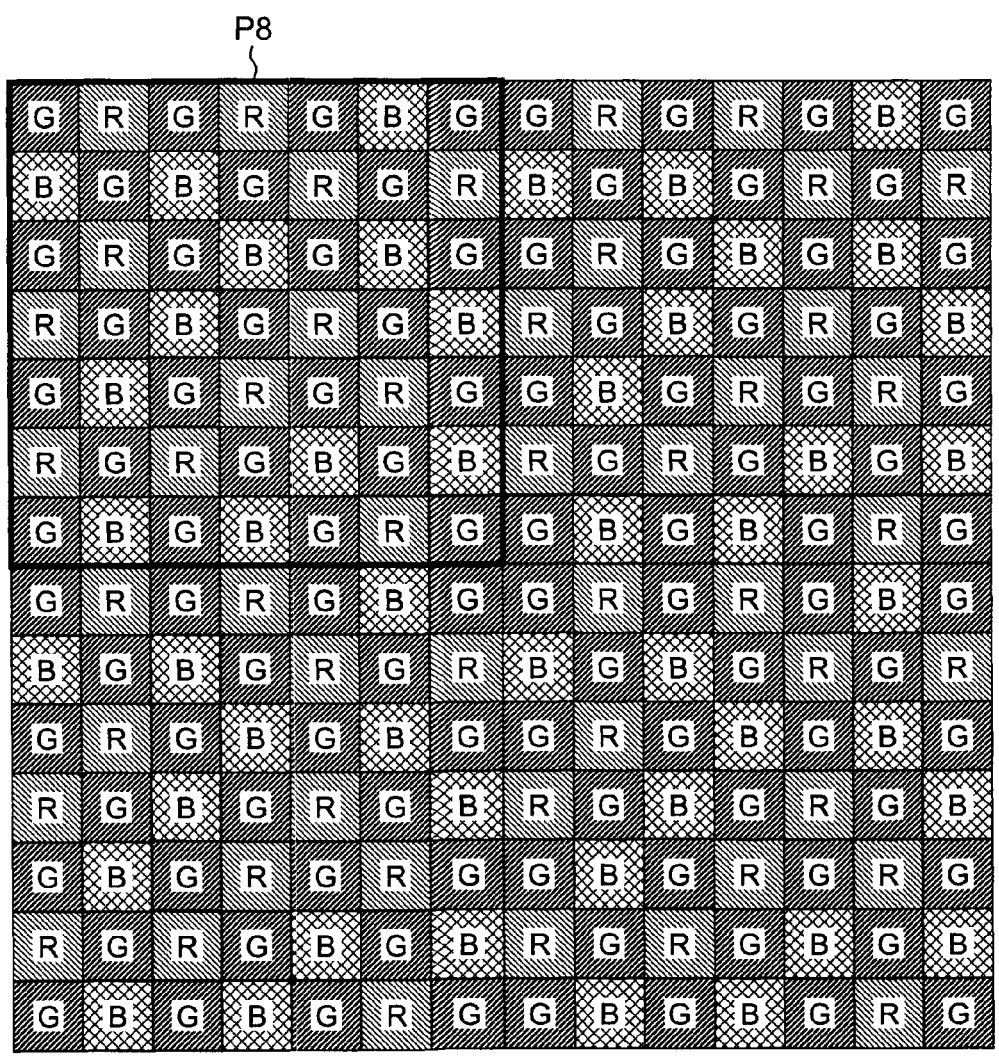
FIG. 18 is a diagram illustrating a ninth embodiment of the single-panel type color imaging device according to the presently disclosed subject matter.
Figure 19:
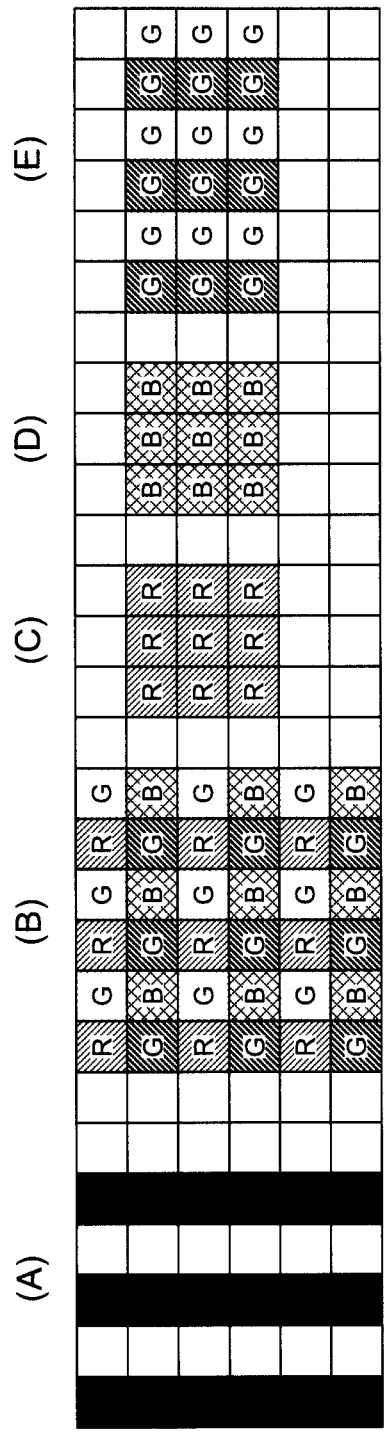
FIG. 19 is a diagram that is used to explain problems of a color imaging device including color filters of a conventional Bayer array.
Figure 20:
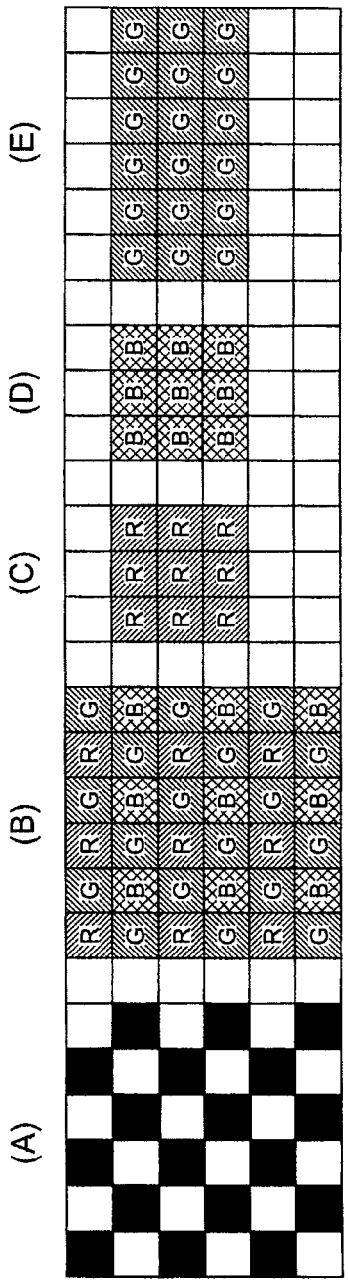
FIG. 20 is another diagram that is used to explain problems of the color imaging device including the color filters of the conventional Bayer array.

FIG. 18 is a diagram illustrating a ninth embodiment of the single-panel type color imaging device according to the presently disclosed subject matter, in particular, a color filter array of color filters that are provided in the color imaging device.

The color filter array of the color imaging device of the ninth embodiment includes the same features as the features (1), (2), (3), (4), and (5) of the color filter array of the color imaging device of the first embodiment, and the feature (8) that is not included in the color filter array of the color imaging device of the first embodiment. Note that the detailed description of the same features as the features of the color filter array of the color imaging device of the first embodiment and the third embodiment is omitted.

(Feature (1))

The color filter array illustrated in FIG. 18 includes a basic array pattern P8 (pattern that is indicated by the thick frame) that is constituted by a square array pattern that corresponds to 7×7 pixels, and the basic array pattern P8 is repeatedly arranged in the horizontal and vertical directions.

Similar to the basic array pattern P7, in the basic array pattern P8, the G filters that are brightness system pixels are arranged in a checkered pattern, that is, the three G filters are arranged on the both diagonal lines and at the middles of each of the four sides. That is, in the color filter array, the color filters of R, G, and B (the R filter, the G filter, and the B filter) are arranged with a certain cycle nature.

However, in the basic array pattern P8, the color filters of R and B (the R filter and the B filter) are arranged irregularly. As a result, the false color can be reduced.

(Feature (2))

In the color filter array illustrated in FIG. 18, the G filter that corresponds to a color that contributes most to obtaining a brightness signal (color of G in the embodiment) is arranged in each line of the horizontal, vertical, and diagonal (NE and NW) directions of the color filter array.

(Feature (3))

Similar to the basic array pattern P7, in the basic array pattern P8 of the color filter array illustrated in FIG. 18, the number of pixels of the R pixel, the G pixel, and the B pixel that correspond to the R filter, the G filter, and the B filter in the basic array pattern are 12 pixels, 25 pixels, and 12 pixels, respectively. That is, a ratio of the number of G pixels that help most to obtain a brightness signal is greater than each ratio of the number of R pixels and the number of B pixels that correspond to the colors other than G.

(Feature (4))

In the color filter array illustrated in FIG. 18, the one or more R filters and the one or more B filters that respectively correspond to the two or more colors other than the above-described color of G (colors of R and B in the embodiment) are arranged in each line of the horizontal and vertical directions of the color filter array in the basic array pattern P8.

(Feature (5))

The color filter array illustrated in FIG. 18 includes a square array that corresponds to 2×2 pixels that are constituted by the G filters. That is, in the basic array pattern P8, because the G pixels are arranged at the four corners, when the two basic array patterns P4 are arranged in the horizontal and vertical directions, that is, four patterns in total, the square array that corresponds to 2×2 pixels that are constituted by the G filters appears at the center part.

(Feature (8))

The basic array pattern P8 of the color filter array illustrated in FIG. 18 is not line symmetrical with respect to the line of the horizontal direction or the vertical direction that passes through the center of the G filter that is arranged at the center of the basic array pattern P8. Thus, in the basic array pattern P8 of the color filter array illustrated in FIG. 18, an array of the G filters in a color filter array that is obtained by down-sampling and reading out the color filter array to 1/6 (=1/(N−1), N=7) in the horizontal direction or the vertical direction is substantially the same as an array of the G filters in the original color filter array.

Note that, in the above-described embodiments, as an example of a basic array pattern of N×N, 5×5 pixels and 7×7 pixels are mainly described, however, the basic array pattern that is included in the technical range of the presently disclosed subject matter is not limited to such cases. As long as the features (1) to (5) or the features (1) to (6), and the feature (7) or (8) are satisfied, in the basic array pattern, N may be an odd number of five or more, for example, 9×9 pixels and 11×11 pixels may be employed. However, in view of the ease of the imaging processing such as the synchronization processing and down-sampling processing at the time of capturing a moving image, it is desirable that N is 10 or less. In addition, in the basic array pattern of N×N, which satisfies the features (1) to (5) or the features (1) to (6), N is not limited to the odd number of five or more. For example, as described in the first embodiment, the basic array pattern of 6×6 pixels in which the two basic array patterns of 3×3 pixels are arranged in the horizontal direction and the vertical direction also satisfies the features (1) to (6). In addition, the basic array pattern of 10×10 pixels, which is described in the second embodiment and the sixth embodiment and in which the two basic array patterns of 5×5 pixels are arranged in the horizontal direction and the vertical direction also satisfies the features (1) to (6). That is, a basic array pattern of even number× even number, which can be divided into basic array patterns of odd number×odd number is also included in the technical range of the presently disclosed subject matter. In addition, in the embodiment that satisfies the feature (7), the feature (8) is also satisfied.

As described above, the presently disclosed subject matter is described with reference to the embodiments, and the technical range of the presently disclosed subject matter is not limited to the range that is described in the above-described embodiments. It is apparent for those skilled in the art that various modifications or improvements can be made to the above-described embodiments. In addition, it goes without saying that it can be appreciated that the presently disclosed subject matter is not limited to the above-described embodiments, and various modifications can be made without departing from the scope and spirit of the presently disclosed subject matter. For example, in the above-described embodiments, the color filter array of the color filter of the three primary colors of R, G, and B is described, however, the type of the color filter is not limited to the above-described embodiments, and a color filter array of color filters of four colors in which another color (for example, emerald (E)) is added to the three primary colors of R, G, and B may be employed. In addition, the presently disclosed subject matter can be applied to a color filter array of color filters of a complementary color system of four colors in which G is added to C (cyan), M (magenta), and Y (yellow) that are complementary colors of the primary colors R, G, and B.

What is claimed is:

1. A single-panel type color imaging device configured by arranging color filters of a certain color filter array on a plurality of pixels that are constituted by photoelectric conversion elements that are arranged in a horizontal direction and a vertical direction,
wherein the color filter array includes a basic array pattern of N×N (N:odd number which is equal to five or more) in which first filters that correspond to a first color that contributes most to obtaining a brightness signal and second filters that correspond to two or more second colors other than the first color are arranged, and the basic array pattern is arranged in the horizontal direction and the vertical direction repeatedly, with no pixel between adjacently arranged basic array patterns,
the first filters are arranged on at least the two diagonal lines of the basic array pattern,
a ratio of a number of pixels of the first color that correspond to the first filters is greater than a ratio of a number of pixels of the each of the second colors that corresponds to the second filters, and
one or more of the second filters that respectively correspond to each of the second colors are arranged in each line of the horizontal direction and the vertical direction of the color filter array in the basic array pattern.

2. The color imaging device according to claim 1,
wherein the first filters are arranged in a checkered pattern in the basic array pattern.

3. The color imaging device according to claim 1,
wherein the first filters are arranged so that an array of the first filters in the color filter array and an array of the first filters in a color filter array that is obtained by down-sampling the color filter array to 1/(N−1) in the horizontal direction or the vertical direction are substantially identical.

4. The color imaging device according to claim 3,
wherein the first filters and the second filters are arranged so that the color filter array and a color filter array that is obtained by down-sampling the color filter array to 1/(N−1) in the horizontal direction or the vertical direction are substantially identical.

5. The color imaging device according to claim 1,
wherein the one or more first filters are arranged in each line of the horizontal direction, the vertical direction, an upper right diagonal direction, and a lower right diagonal direction of the color filter array.

6. The color imaging device according to claim 1,
wherein the color filter array includes a square array that corresponds to 2×2 pixels that are constituted by the first filters.

7. The color imaging device according to claim 1,
wherein the color filter array in the certain basic array pattern is point symmetrical with respect to a center of the basic array pattern.

8. The color imaging device according to claim 1,
wherein the color filter array in the certain basic array pattern is line symmetrical with respect to at least one of lines of the horizontal direction, the vertical direction, an upper right diagonal direction, and a lower right diagonal direction that pass through a center of the basic array pattern.

9. The color imaging device according to claim 1,
wherein the first color is a green (G) color, and the second colors are a red (R) color and a blue (B) color.

10. The color imaging device according to claim 9,
wherein the color filter includes an R filter, a G filter, and a B filter that respectively correspond to the red (R) color, the green (G) color, and the blue (B) color, and
the R filter, the G filter, and the B filter are arranged so that the filters having different colors are adjacent to each other in the horizontal direction and the vertical direction of the color filter array in the basic array pattern.

11. The color imaging device according to claim 9,
wherein the color filter includes an R filter, a G filter, and a B filter that respectively correspond to the red (R) color, the green (G) color, and the blue (B) color, and
the R filter, the G filter, and the B filter are arranged along the upper right diagonal direction or the lower right diagonal direction of the color filter array in the basic array pattern.

12. The color imaging device according to claim 9,
wherein the color filter includes an R filter, a G filter, and a B filter that respectively correspond to the red (R) color, the green (G) color, and the blue (B) color, and
R filters and B filters are irregularly arranged so that the number of the R filters and the number of the B filters are equal in the basic array pattern.

* * * * *